US011922113B2

United States Patent
Thies

(10) Patent No.: US 11,922,113 B2
(45) Date of Patent: Mar. 5, 2024

(54) SYSTEMS, METHODS, AND DEVICES FOR E-MAIL RENDERING

(71) Applicant: Email on Acid, LLC, San Antonio, TX (US)

(72) Inventor: John Thies, Highlands Ranch, CO (US)

(73) Assignee: Email on Acid, LLC, San Antonio, TX (US)

( * ) Notice: Subject to any disclaimer, the term of this patent is extended or adjusted under 35 U.S.C. 154(b) by 0 days.

(21) Appl. No.: 17/572,362

(22) Filed: Jan. 10, 2022

(65) Prior Publication Data
US 2022/0222422 A1    Jul. 14, 2022

Related U.S. Application Data

(60) Provisional application No. 63/136,291, filed on Jan. 12, 2021.

(51) Int. Cl.
| | |
|---|---|
| *G06F 40/143* | (2020.01) |
| *G06F 16/957* | (2019.01) |
| *G06F 16/958* | (2019.01) |
| *G06F 40/221* | (2020.01) |
| *G06N 20/00* | (2019.01) |
| *H04L 51/10* | (2022.01) |

(52) U.S. Cl.
CPC ........ *G06F 40/143* (2020.01); *G06F 16/9577* (2019.01); *G06F 16/986* (2019.01); *G06F 40/221* (2020.01); *G06N 20/00* (2019.01); *H04L 51/10* (2013.01)

(58) Field of Classification Search
CPC .... G06F 40/143; G06F 40/221; G06F 16/957; G06F 16/986; H04L 51/10; G06N 20/00
See application file for complete search history.

(56) References Cited

U.S. PATENT DOCUMENTS

| | | |
|---|---|---|
| 9,037,914 B1 | 5/2015 | Au et al. |
| 9,049,222 B1 * | 6/2015 | He .................... G06F 21/566 |
| 9,317,485 B2 * | 4/2016 | Dent .................. G06Q 10/107 |
| 10,423,709 B1 | 9/2019 | Bradley et al. |

(Continued)

OTHER PUBLICATIONS

Final Office Action received for U.S. Appl. No. 16/682,590, dated Apr. 28, 2020, 13 pages.

(Continued)

*Primary Examiner* — Thu V Huynh
(74) *Attorney, Agent, or Firm* — Neugeboren O'Dowd PC

(57) ABSTRACT

Systems, methods, and storage media for rendering and displaying e-mails are disclosed. Exemplary implementations may: receive a first file, wherein the first file comprises an e-mail written in HTML; determine a display structure of the contents of the email written in HTML; access a DOM structure of the first file; create a second file in a first file format by parsing the DOM structure, wherein the second file comprises a first object; create a third file comprising one or more first markup language blocks in a first markup language format; process the one or more first markup language blocks to create a plurality of second markup language components; identify a mapping between the first file and the plurality of second markup language components; create, based on the mapping, a fourth file in a HTML format; and render and display the fourth file in one or more email clients.

20 Claims, 11 Drawing Sheets

(56) References Cited

U.S. PATENT DOCUMENTS

| | | |
|---|---|---|
| 11,019,009 B2 | 5/2021 | Thies |
| 11,144,441 B1 | 10/2021 | Colwell et al. |
| 11,176,313 B1* | 11/2021 | Bitar .................. G06Q 10/107 |
| 2003/0041126 A1 | 2/2003 | Buford et al. |
| 2003/0093565 A1 | 5/2003 | Berger et al. |
| 2007/0039038 A1 | 2/2007 | Goodman et al. |
| 2008/0139191 A1 | 6/2008 | Melnyk et al. |
| 2009/0037517 A1 | 2/2009 | Frei |
| 2010/0312547 A1 | 12/2010 | Van Os et al. |
| 2011/0022387 A1 | 1/2011 | Hager |
| 2011/0037767 A1 | 2/2011 | Casanova et al. |
| 2011/0264705 A1 | 10/2011 | Diamond |
| 2013/0166657 A1 | 6/2013 | Tadayon |
| 2015/0095084 A1 | 4/2015 | Cordasco et al. |
| 2015/0106928 A1 | 4/2015 | Stenmann et al. |
| 2015/0161087 A1 | 6/2015 | Khoo |
| 2016/0059136 A1 | 3/2016 | Ferris |
| 2016/0140328 A1 | 5/2016 | Pathak et al. |
| 2018/0024986 A1 | 1/2018 | Singh et al. |
| 2019/0005389 A1 | 1/2019 | Glyman et al. |
| 2020/0120050 A1* | 4/2020 | Jung .................. H04L 51/216 |
| 2020/0153771 A1 | 5/2020 | Thies |
| 2021/0344633 A1* | 11/2021 | Bar-On .................. H04L 51/42 |

OTHER PUBLICATIONS

Non Final office Action received for U.S. Appl. No. 16/682,590, dated Jan. 7, 2020, 12 pages.

Non Final office Action received for U.S. Appl. No. 16/682,590, dated Dec. 10, 2020, 14 pages.

Non Final office Action received for U.S. Appl. No. 17/314,498 dated Jan. 14, 2022, 68 pages.

Response filed on Apr. 1, 2020 for Non Final Office Action of U.S. Appl. No. 16/682,590 dated Jan. 7, 2020, 13 pages.

Response filed on Jun. 18, 2020 for Final Office Action of U.S. Appl. No. 16/682,590 dated Apr. 28, 2020, 14 pages.

Response filed on Mar. 4, 2021 for Non Final Office Action of U.S. Appl. No. 16/682,590 dated Dec. 10, 2020, 12 pages.

International Search Report and Written Opinion regarding International Application No. PCT/US22/11843, dated Apr. 11, 2022, 11 pages.

WIPO, "International Preliminary Report on Patentability Regarding International Application No. PCT/2022/011843", dated Jul. 27, 2023, p. 6.

* cited by examiner

SYSTEMS, METHODS, AND DEVICES FOR E-MAIL RENDERING

CROSS REFERENCE TO RELATED APPLICATIONS

The present application for patent claims priority to U.S. Provisional Application No. 63/136,291 entitled "Systems, Methods, and Devices for E-mail Rendering", filed Jan. 12, 2021, assigned to the assignee hereof and the entire disclosure of which is hereby incorporated by reference for all purposes. The present application for patent is also related to co-owned U.S. patent application Ser. No. 16/682,590, entitled "E-MAIL TESTING AND RENDERING PLATFORM", filed Nov. 13, 2019, now issued as U.S. Pat. No. 11,019,009, which claims priority to U.S. Provisional Application No. 62/760,688, entitled "E-MAIL TESTING AND RENDERING PLATFORM," filed Nov. 13, 2018, which is hereby incorporated by reference herein in its entirety.

FIELD OF THE DISCLOSURE

The present disclosure relates generally to e-mail testing and rendering. In particular, but not by way of limitation, the present disclosure relates to systems, methods and apparatuses for ensuring proper display of e-mails to and through various e-mail clients and e-mail mailbox providers.

BACKGROUND

Organizations that rely on e-mail for marketing often send out e-mails to very large distribution lists. Often, these lists are built up over long periods of time and/or at great expense. In order to maximize return (such as clicks, website views, and purchases) through these e-mails, these organizations often devote significant resources to ensure their emails render properly in every e-mail client. Organizations often want to ensure that they are e-mailing potential customers with appropriate frequency, with effective messages, and with minimal interference from e-mail delivery and display problems. Therefore, they often employ professional marketing staff, web developers, and quality assurance testers to improve e-mail quality and effectiveness.

One of the biggest challenges with email marketing is that sometimes email clients (i.e., GMAIL, YAHOO, MICROSOFT OUTLOOK, etc.) display the same email HTML differently, just like modern web browsers (e.g., Internet Explorer, Firefox, Chrome, Opera) display HTML differently. However, with email rendering, it is much more challenging to create email HTML due to the number of email clients to design for, having to code for outdated email clients that subscribers still use and added security contained within the email clients' rendering engines. They do not support any JavaScript, like all modern web browsers, or anything that might compromise the security and integrity of recipient's computer or mobile device.

There are several mass e-mail delivery services that help marketers create and send e-mails as well as companies that provide email testing services, but they do not solve the problem of email rendering. This means that marketers often spend more time than is desired on checking and rechecking aspects of these e-mails, only to realize that a large number of e-mails experienced readability problems. Such e-mail problems are a source of stress for marketers, developers, and quality assurance specialists. Thus, there is a need to remedy the problem of every email client supporting different aspects of HTML.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a method for rendering emails, the method comprising: receiving a first file, wherein the first file comprises an e-mail written in Hypertext Markup Language (HTML), the email comprising one or more contents and one or more tags; determining a display structure of the contents of the email written in HTML; accessing a Document Object Model (DOM) structure of the first file, wherein the DOM structure comprises a root node and one or more nodes, each of the one or more nodes associated with at least one of the one or more contents and the one or more tags; and creating a second file in a first file format, wherein the second file comprises a first object. In some embodiments of the method, the second file may be created by parsing the DOM structure comprising the root node and the one or more nodes into the first object. In some embodiments, the method further comprises converting the first object into a first markup language format, wherein the converting comprises creating a third file in the first markup language format, the third file comprising one or more first markup language blocks; processing the one or more first markup language blocks in the third file to create a plurality of second markup language components in a second markup language format; identifying a mapping between the first file and the plurality of second markup language components; creating a fourth file, the fourth file comprising an HTML format, wherein the fourth file is created based on the mapping; and rendering and displaying the fourth file in one or more email clients.

Other embodiments of the disclosure may be characterized as an email rendering and display system, comprising one or more hardware processors configured by machine-readable instructions to: receive a first file, wherein the first file comprises an e-mail written in Hypertext Markup Language (HTML), the email comprising one or more contents and one or more tags; determine a display structure of the contents of the email written in HTML; access a Document Object Model (DOM) structure of the first file, wherein the DOM structure comprises a root node and one or more nodes, each of the one or more nodes associated with at least one of the one or more contents and the one or more tags; and create a second file in a first file format, wherein the second file comprises a first object. In some examples, the one or more hardware processors are configured by the machine-readable instructions to create the second file in the first file format by parsing the DOM structure comprising the root node and the one or more nodes into the first object. Further, the one or more hardware processors are configured to convert the first object into a first markup language format, wherein the converting comprises creating a third file in the first markup language format, the third file comprising one or more first markup language blocks; process the one or more first markup language blocks in the third file to create a plurality of second markup language components in a second markup language format; identify a mapping between the first file and the plurality of second markup language components; create a fourth file, the fourth file comprising an HTML format, wherein the fourth file is created based on the mapping; and render the fourth file in one or more email clients.

Still other embodiments of the disclosure may be characterized as a non-transitory, tangible computer readable storage medium, encoded with processor readable instructions to perform a method for rendering e-mails, the method comprising: receiving a first file, wherein the first file comprises an e-mail written in Hypertext Markup Language (HTML), the email comprising one or more contents and one or more tags; determining a display structure of the contents of the email written in HTML; accessing a Document Object Model (DOM) structure of the first file, wherein the DOM structure comprises a root node and one or more nodes, each of the one or more nodes associated with at least one of the one or more contents and the one or more tags; and creating a second file in a first file format, wherein the second file comprises a first object, and wherein the second file is created by parsing the DOM structure comprising the root node and the one or more nodes into the first object. In some embodiments of the non-transitory, tangible computer-readable storage medium, the method further includes converting the first object into a first markup language format, wherein the converting comprises creating a third file in the first markup language format, the third file comprising one or more first markup language blocks; processing the one or more first markup language blocks in the third file to create a plurality of second markup language components in a second markup language format; identifying a mapping between the first file and the plurality of second markup language components; creating a fourth file, the fourth file comprising an HTML format, wherein the fourth file is created based on the mapping; and rendering the fourth file in one or more email clients.

In some examples of the method, the email rendering and file system, and/or the non-transitory computer readable storage medium, determining the display structure of the contents of the email written in HTML comprises inspecting one or more of rows, columns, HTML elements, Cascading Style Sheet (CSS) styles, image nodes, text nodes, and meda queries.

In some examples of the method, the email rendering and file system, and/or the non-transitory computer readable storage medium, creating the third file in the first markup language format comprises walking the DOM structure to determine Cascading Style Sheet (CSS) inheritance and CSS styles directly defined within the one or more nodes.

In some examples of the method, the email rendering and file system, and/or the non-transitory computer readable storage medium, the first object comprises a JavaScript Object Notation (JSON) object.

In some examples of the method, the email rendering and file system, and/or the non-transitory computer readable storage medium, the one or more first markup language blocks in the third file comprise one or more of HTML ID attributes, div tags, Cascading Style Sheet (CSS) styles, and CSS elements.

In some examples of the method, the email rendering and file system, and/or the non-transitory computer readable storage medium, identifying the mapping between the first file and the plurality of second markup language components in the second markup language format comprises using an artificial intelligence (AI) or machine learning (ML) algorithm to map the HTML in the first file to the second markup language.

Some examples of the method, the email rendering and file system, and/or the non-transitory computer readable storage medium described above may further include processes, features, means, or instructions for rendering each of the first file and the fourth file in two or more email clients; comparing the rendering of the first file and the fourth file for each of the two or more clients; identifying one or more changes to the mapping between the first file and the plurality of second markup language components; and updating the fourth file based on identifying the one or more changes.

In some examples of the method, the email rendering and file system, and/or the non-transitory computer readable storage medium described above, the first file and the fourth file may comprise similar or substantially display characteristics when rendered. In some examples of the method, the email rendering and file system, and/or the non-transitory computer readable storage medium described above the third file comprises one or more of HTML ID attributes, div tags, Cascading Style Sheet (CSS) styles, and CSS elements. In some examples of the method, the email rendering and file system, and/or the non-transitory computer readable storage medium described above, the fourth file comprises data stored in HTML syntax.

It is contemplated that the second file in the first format may comprise a file in an object-oriented programming (OOP) language, for instance, Java, JavaScript, C++, etc. Further, the first object in the second file may include a JavaScript Object Notation (JSON) object, although other types of OOP objects are contemplated in different embodiments. It is further contemplated that the third file in the first markup language format may herein be referred to as a file in the Athena Markup Language (AML), a markup language developed by EMAIL ON ACID of Greenwood Village, Colorado Other types of custom and/or proprietary languages known and used in the art are also contemplated in different embodiments, and the examples listed herein are not intended to be limiting. In some cases, the AML syntax may be based in part on (or derived from) one or more of CSS, HTML, or any other applicable programming language. In some cases, the second markup language format may comprise a markup language format such as EMAIL ON ACID MARKUP LANGUAGE (EML) developed by EMAIL ON ACID of Greenwood Village, Colorado, although other types of markup languages are also contemplated in different embodiments. As described in further detail below, the second markup language may be translated/converted to HTML, and vice-versa. In other words, the second markup language components (also referred to as second markup language elements) may be mapped to HTML components (or HTML elements) and vice-versa. In some aspects, the second markup language may facilitate the generation of responsive HTML that renders (or displays), as intended, across a plurality of email clients running on different types of devices, operating systems, device models/versions, etc. For instance, the second markup language may simplify the coding and design process for writing different sections of HTML code so as to providing the same or similar user interface (UI) for an email displayed by different email clients. In some examples, the second markup language components may be created by processing the styling and display related information (i.e., within the first markup language blocks) and generating a mapping (e.g., one to one mapping) between the second markup components and one or more of the first markup language blocks and the elements/components in the input HTML. These second markup language components (e.g., button component, drop-down menu component, table component) may be reusable in future email templates. In some cases, different CSS styles (e.g., different text, different font size/color/font type, etc.) may be passed (i.e., applied) to the second markup language components.

In some examples, there may be a one-to-one mapping between each HTML component/element in the input HTML and/or each first markup language block to the second markup language component(s). In such cases, the second markup language components can be translated or converted into HTML code, where the HTML code may include different sections for each HTML component/element in the input HTML, where each section may include formatting/styling rules for different media queries. As an example, if the input HTML for an email was designed on a desktop/PC, it may or may not include different exceptions (e.g., resizing of font, images, etc., deselect one or more features, such as a hover feature, to name two non-limiting examples) to ensure that user experience is not deteriorated when the email is accessed from a mobile device.

According to aspects of this disclosure, the output HTML generated from the second markup language components may include additional sections of HTML code whose use may be triggered based on media queries, accessibility/ disability factors, etc. In some cases, if there is no existing mapping between an HTML element or a first markup language block and a second markup language component, the system of the present disclosure may utilize Artificial Intelligence (AI) or Machine Learning (ML) techniques to generate a second markup language component that when compiled (i.e., converted or translated) into HTML has the same or similar display characteristics as the HTML element/component in the input HTML. In some examples, the AL or ML algorithm may utilize one or more of the DOM structure of the input HTML and the first markup language blocks (i.e., comprising HTML ID attributes, table(s), div(s), CSS styles, etc.) as machine learning input to generate the mapping. Additionally, or alternatively, the AI or ML algorithm may fine-tune the mapping by comparing the rendering of the input HTML and simulated renderings of the output HTML on different email clients. The system may update the fourth file containing the output HTML based on this fine-tuning, which may serve to enhance user experience for email subscribers.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
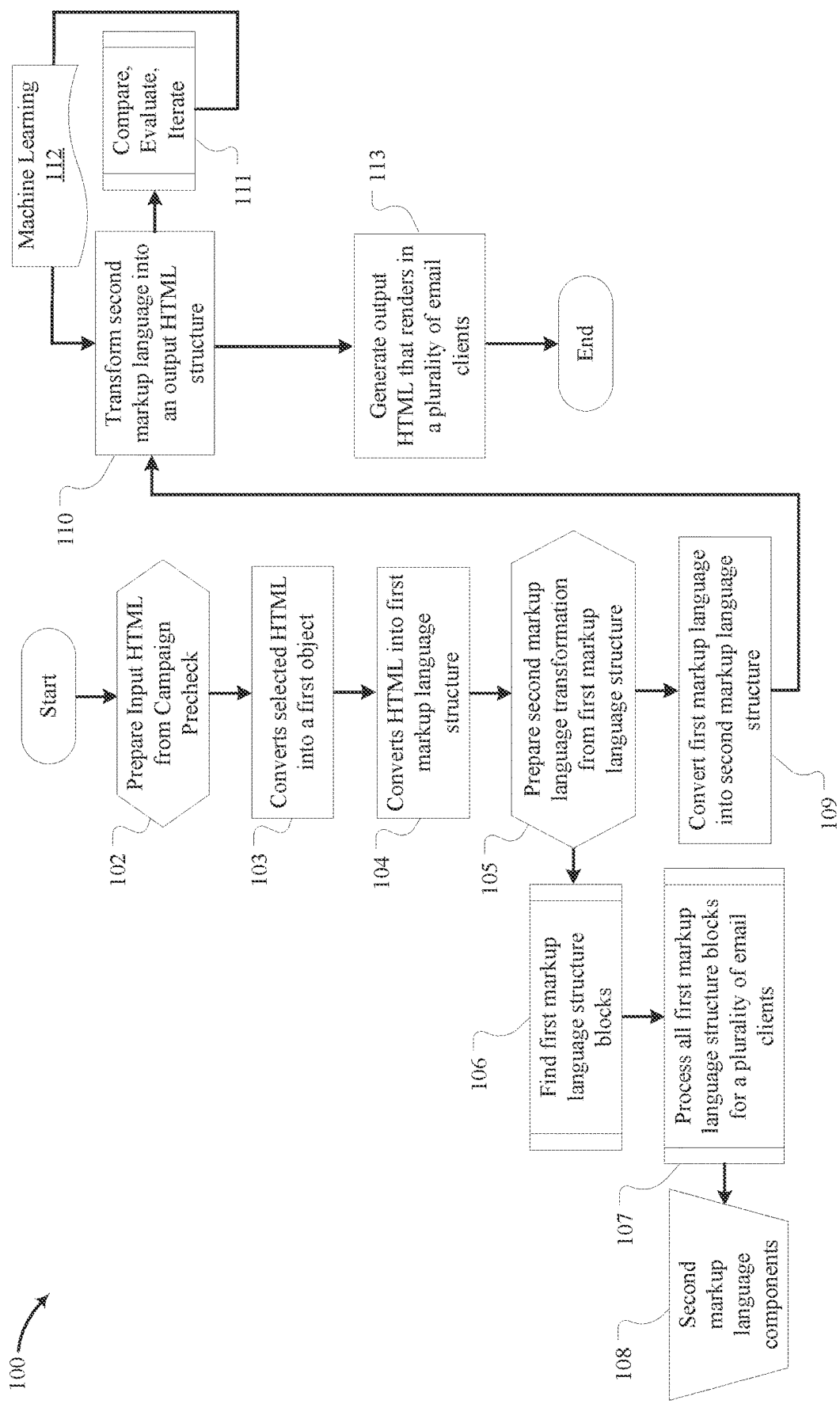
FIG. 1 illustrates a flowchart of a method for rendering and displaying an email, according to various aspects of the disclosure.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

The system and methods of the present disclosure may be best understood by referring to the flowcharts, as well as system and block diagrams in the accompanying Figures. Throughout the disclosure, reference may be made to an email testing and rendering platform, which may comprise the email testing and rendering platform shown and described in co-owned U.S. patent application Ser. No. 16/682,590, entitled "E-MAIL TESTING AND RENDERING PLATFORM", filed Nov. 13, 2019, now issued as U.S. Pat. No. 11,019,009, which claims priority to U.S. Provisional Application No. 62/760,688, entitled "E-MAIL TESTING AND RENDERING PLATFORM," filed Nov. 13, 2018, which is hereby incorporated by reference herein in its entirety. Aspects of both the above-referenced application and the present disclosure allow users to test e-mails for numerous quality issues before sending them out.

The term "user" in this disclosure may be used to refer to marketers, developers, and quality assurance analysts somewhat interchangeably. Many marketers send hundreds of thousands, or millions of e-mails at a time, and because these e-mails are received by many different people, on many different types of computing devices, through many different e-mail servers, there are a multitude of ways an e-mail can fail to be properly sent, received, interacted with, rendered, and viewed. Each type of failure results in lost opportunity for the sender. The features described herein provide ways to reduce these failures.

As used herein, the term "HTML element" refers to a type of HTML document component, one of several types of HTML nodes. An HTML document (e.g., associated with an email, a web page) may be composed of a tree of simple HTML nodes, such as text nodes, and HTML elements, which may be used to add semantics and/or formatting to parts of the document. In some cases, an HTML element may include HTML attributes. Some non-limiting examples of HTML elements include the HTML element (i.e., <html>), heading (e.g., <h1>, <h2>, <h3>, etc.), paragraph (i.e., <p>), image (i.e., <img>), table (i.e., <table>), etc. The HTML element or <html> represents the root (top-level element) of an HTML document. All other elements in a HTML document descend from this root element. In some cases, HTML elements may be nested, which means that an element may contain other elements.

Interactive emails refer to emails with one or more interactive elements that enable subscribers to click and do something within an email. Some non-limiting examples of interactive elements include elements that allow a user to manipulate content, add items to a shopping cart, take part in a quiz, complete a survey, and/or play a game. In some cases, an email marketer may wish to use hover effects and rollovers to show close-ups or the backside of products. In other cases, an email marketer may wish to use interactive accordions in their email content, or prompt subscribers to click through and provide testimonials, product reviews, or fill out forms directly through their inbox (i.e., as opposed to being redirected to another web page). In other cases, an interactive email may include an interactive hotspot (e.g., positioned information overlays to deliver additional contextual information on an image in an email). As an example, an email may comprise an infographic incorporating one or more interactive hotspots, that when hovered over, display a small text overlay next to the hotspot that provided more information about the statistics within the infographic. In some circumstances, interactive email content (e.g., interactive hotspots, may or may not include hotspot toggling in touchscreen devices; hover effects, for instance, when a user hovers over an icon it gives the impression that the icon is reversing; side-scrolling images, etc.) may not always work, uniformly, across all email clients. For instance, in some cases, interactive hotspots may only work in certain email clients (e.g., email clients that support the ":hover pseudo-class"). In some other cases, interactive email content that displays properly (i.e., as designed) on desktop clients may appear "funky" when displayed on a mobile device, such as a smartphone or a tablet. According to aspects of this disclosure, a system is provided that helps a user (e.g., email marketer, marketing manager, brand manager, etc.) in ensuring that their email displays (as intended) across a plurality of email clients (e.g., iOS MAIL, APPLE MAIL, YAHOO! MAIL, GMAIL, etc.) and/or across a plurality of different devices (e.g., smartphones, tablets, PCs or Desktops, devices utilizing different operating systems, to name a few non-limiting examples).

In some cases, a file containing email HTML may include email content (e.g., text portion of email, images, etc.) and one or more blocks (e.g., a style block associated with an interactive hotspot for a desktop device, a style block associated with a hotspot toggling feature when an email is displayed on a touch screen device, animated image carousels, responsive rollover images, etc.). In some instances, the one or more blocks (also referred to as formatting or style specific portions) may comprise one or more of HTML ID attributes, HTML div tags, Cascading Style Sheet (CSS) styles, and/or CSS elements, to name a few non-limiting examples. Additionally, or alternatively, the one or more blocks may comprise one or more pseudo-elements. As used herein, the term "pseudo-elements" may refer to pieces of CSS code that may be used to style specific parts of an HTML element. In one non-limiting example, pseudo-elements may be used to add a hover effect for a button in an email, for instance, change the background and/or border color of a static button when a cursor hovers the button. In another non-limiting example, pseudo elements may be used to add content (e.g., >>>) after a cursor hovers over a button. In some cases, aspects of this disclosure relate to evaluating compatibility of such display structures in email HTML for a plurality of email clients, device types, operating system versions, light vs dark mode, etc. It is contemplated that, in some embodiments, the one or more blocks may also be referred to as one or more first markup language blocks.

In some examples, media queries may enable an email developer to create a responsive email, for instance, by detecting the width of the display, further described below in relation to FIG. 9. In this way, media queries allow email developers to create emails that display appropriately on both mobile and desktop devices. In other cases, media queries may be used to target certain resolutions or even specific email clients. Media queries may contain any number of optional expressions that may limit when the query will trigger, such as width, pixel density, orientation, a specific email client, etc., and may enable developers to customize their email content for different presentation mediums. In one non-limiting example, the media query may include a max-width, and at any width less than the max-width specified, all of the CSS within the media query may take effect.

FIG. 1 is a flowchart 100 showing a method for rendering and displaying an email, according to various aspects of the disclosure. Each of the steps will be described in further detail throughout the disclosure. An advantage to the method of the present disclosure is that it may remove the need for marketers to: (1) use a service that shows them how their emails will display in the most popular email clients or (2) manually send an email to the email clients to see how the email is rendered and displayed. This process may remove the need for those prior approaches, or any other method being used to determine email renderability, by automatically converting any given HTML into a new HTML structure, which will ensure the same design, structure, formatting, style and display as the original HTML, that will render correctly in the most popular email clients. In some cases, the method of flowchart 100 may be performed by a system (e.g., computer system 300, system 400, system 500, and/or system 800) of the present disclosure.

At step 102, the method may comprise preparing an input HTML from a campaign precheck. In some cases, the system (e.g., system 800) may ask a user if they have the content of the e-mail the user wants to start a "campaign precheck process" on. In such cases, the user may submit the hypertext markup language (HTML) text/code in an input field, or alternatively, supply a Uniform Resource Locator (URL) associated with the HTML text/code. Often, professional e-mail marketers will write the content of the e-mail from scratch, in HTML code, or use predefined templates for maximum control of the content. The terms "e-mail content" and "HTML code" used to create the email may be used somewhat interchangeably throughout the disclosure. The e-mail content on which the methods of the present disclosure are performed may be referred to as an e-mail that has been "previously created". It may refer to any e-mails created by a user in any format, in any way. In embodiments, another portion of the e-mail pre-deployment platform may be used to create the e-mail whose HTML is then provided to the platform. In other embodiments, users may send their email content and its underlying HTML code to the email pre-deployment platform provider via other methods, such as their Email Service Provider (ESP) or APIs. In embodiments, a user can indicate that the content is not in HTML or at a URL. For example, the user may have the e-mail in a template preloaded in their e-mail service provider ("ESP," such as MAILCHIMP, SENDGRID, and others). In such embodiments, the user may have the option to send an email from the ESP to the e-mail application platform of the present disclosure. In embodiments, the user sending the email may be remote from the platform provider. The e-mail application which is the subject matter of the present disclosure may be referred to herein as the "system" or "platform". The platform may automatically receive the email and initiate the campaign precheck process.

This input HTML may be prepared, as shown at step 102. This preparation may comprise inspecting the structure and layout of the given HTML. This phase may comprise evaluating the rows, columns, HTML elements, CSS styles, image and text nodes, media queries and anything else that is needed to support the structure, style and display of the HTML (e.g., in a standard browser on a desktop/PC, a mobile app provided by an email client, an email client accessed from a mobile browser, to name a few non-limiting examples).

Still referring to step 102, once the HTML structure evaluation is complete, the next phase will clean the HTML and remove any unnecessary HTML elements while maintaining the original structure, style, content and display. Often, additional HTML structure is used but not necessarily needed. The goal of this step is to produce clean, simplified, minimal HTML that keeps the original HTML's visual display intact. As used herein, the term "selected HTML" may refer to the HTML after step 102, namely, the input HTML after it has been cleaned and any unnecessary HTML elements been removed.

At step 103, the method may comprise converting the HTML into a different format (e.g., a string, such as a JSON string; an object, such as a JSON object, etc.). In one non-limiting example, the HTML may be converted into a first format, where the first format may comprise JavaScript Object Notation or JSON. JSON (also referred to as JavaScript JSON) is a format for storing and transporting data. In some circumstances, JSON may be used for sending data from a server to a web page. The JSON syntax is derived from JavaScript object notation syntax. Typically, the JSON format is text only and is syntactically identical to the code for creating JavaScript objects. In some examples, JavaScript programs may support conversion of JSON data (e.g., a string) into native JavaScript objects and vice-versa.

Figure 6:
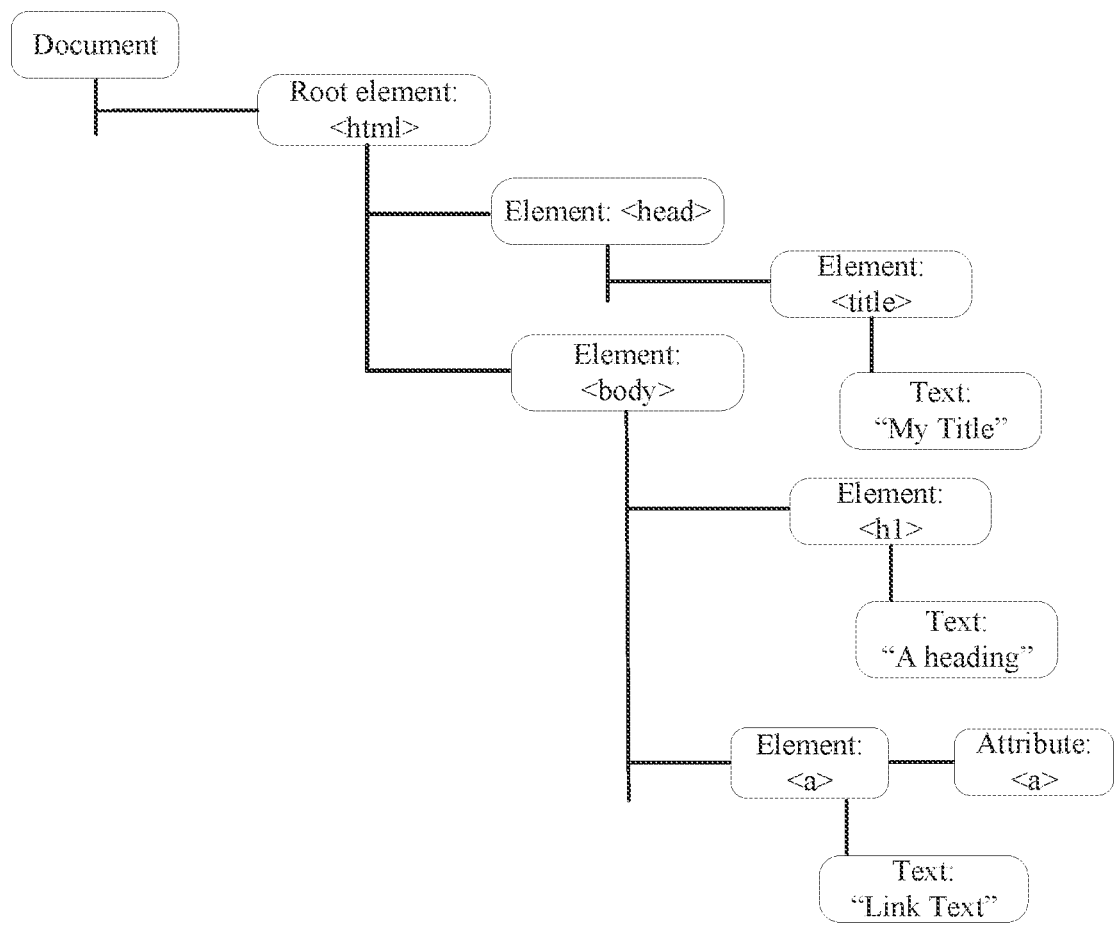
FIG. 6 illustrates an example of a Document Object Model (DOM) tree, in accordance with one or more implementations.
Figure 7:
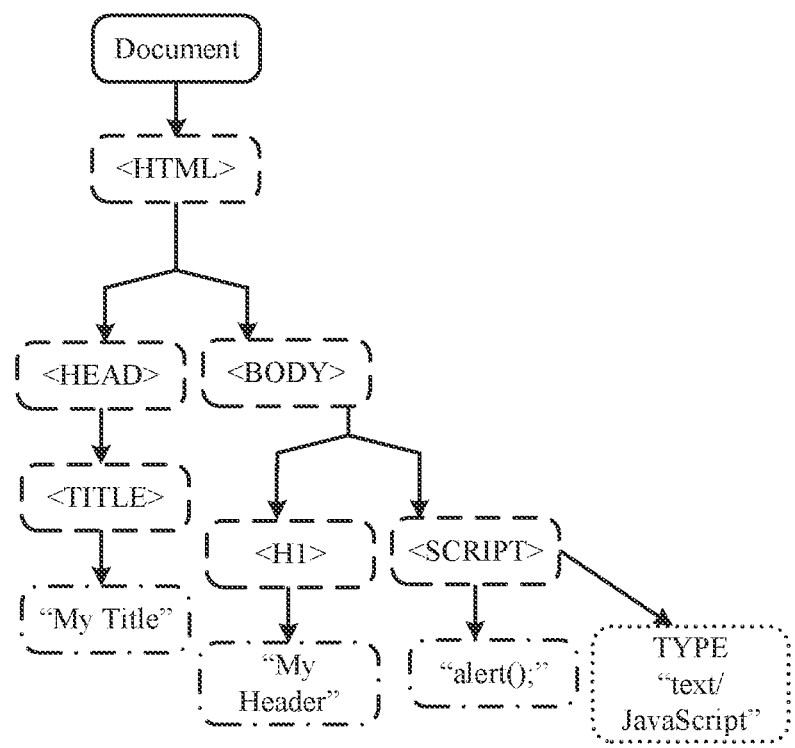
FIG. 7 illustrates another example of a DOM tree, in accordance with one or more implementations.

In some examples, a first object having the first format may be created, where the first object further comprises a HTML Document Object Model (DOM). For example, the next step, shown at 103, is to create a JSON object containing HTML DOM (Document Object Model). The DOM, as referred to within this disclosure, may be defined as a document with a logical tree. Each branch of the tree ends in a node, and each node contains objects. DOM methods allow programmatic access to the tree; with them you can change the document's structure, style, or content. In the system of the present disclosure, the first object (e.g., JSON object) may parse the DOM into the node/leaf objects that makeup the display of the HTML elements. FIGS. 6 and 7 illustrate examples of DOM trees 600 and/700, respectively, according to various aspects of the disclosure. Alternatively, at step 103, the method may comprise creating a JSON string containing HTML DOM.

At step 104, the method may comprise converting the input HTML associated with the e-mail received by the e-mail pre-deployment platform into a first markup language format. In some examples, the first markup language format may comprise a first markup language structure, where the first markup language structure is different from the input HTML structure. In some examples, at step 104, the system may create a first markup language structure with the first object (e.g., JSON object, JSON string). One non-limiting example of the first markup language structure may comprise a custom and proprietary markup language, such as ATHENA MARKUP LANGUAGE (AML) or ATHENA, developed by EMAIL ON ACID of Greenwood Village, Colorado. It should be noted that other markup language structures besides AML or Athena are contemplated in different embodiments and the examples listed herein are not intended to be limiting. In some cases, converting the input HTML into the first format comprising the first markup language structure (e.g., AML structure) may comprise parsing each DOM node element contained in the first object (e.g., JSON object, JSON string) to generate the Cascading Style Sheets (CSS) style(s) and display of each HTML element. In some cases, creating the first custom markup language structure, such as AML, may be based at least in part on traversing (e.g., walking up) the DOM tree (e.g., shown as DOM tree 600, DOM tree 700) to determine CSS inheritance and/or the CSS styles directly defined within one or more of the DOM node elements. In some embodiments, the first markup language structure may be associated with the display structure and/or style specific information in the input HTML.

Once the first object (e.g., JSON object, JSON string) is converted into the first markup language format having the first markup language structure (e.g., AML or Athena), the next step is to prepare the AML object(s) for translation into a second markup language format, as shown by step 105. In some embodiments, the first object (e.g., JSON object, JSON string) may be converted into one or more second objects (e.g., AML objects), where each of the one or more second objects may be stored in the first markup language format (e.g., AML or Athena). In some examples, the second markup language format may comprise a second markup language structure, where the second markup language structure is different from the input HTML structure and/or the first markup language structure. One non-limiting example of a second markup language structure may comprise EMAIL ON ACID MARKUP LANGUAGE or EML, which is a custom XML markup language developed by EMAIL ON ACID of Greenwood Village, Colorado In some instances, the second markup language, such as EML, may allow the system (e.g., system 400, system 800) to use a semantic syntax to create HTML, such as HTML associated with an email (also referred to as email HTML). In some examples, this may encompass the use of high-level object-oriented components following an object-oriented programming design and/or reusable elements, which may serve to minimize the complexity in transitioning the original HTML to a new email HTML structure (e.g., a simplified email HTML structure having the same or similar visual/display characteristics as the original HTML). In some cases, each HTML element may have a correlating second markup language component (e.g., EML component) which may help provide a mapping for one or more HTML element Attribute(s) and/or Style(s).

At step 106 (also referred to as the translation step), the method may comprise evaluating one or more of the first markup language block elements (i.e., the AML blocks or AML block elements, such as, but not limited to, HTML elements such as table(s), div(s), etc.), attributes, styles, and positioning to identify the display properties of the input HTML. In some cases, the terms "first markup language objects", "first markup language blocks", and "first markup language block elements" may be used interchangeably throughout this disclosure.

Further, at step 107, the method may comprise processing one or more first markup language block elements (i.e., first markup language blocks) for a plurality of email clients and then mapping each first markup language block (e.g., AML block element) to a second markup language component (e.g., EML component) at step 108. Given the complexity of HTML and how a web page and/or an email can be designed or developed in multiple different ways to achieve the same outcome, Machine Learning (ML) and Artificial Intelligence (AI) techniques may be used to help create the second markup language components (e.g., EML components) and associated mapping. In some cases, the system of the present disclosure may utilize manually developed application code to create the elements (e.g., first markup language blocks, such as AML block elements) that can be easily mapped to EML components. In some circumstances, however, not every first markup language block (or first language block element) may be easily mapped to a second markup language component (e.g., EML component) based on the element's defined attributes, styles and positioning. This is where ML and AI may be used to assist in the mapping of the original HTML element(s) to EML component(s). The system may be trained to learn and predict an optimal way for mapping the HTML to the second markup language (e.g., EML) such that the HTML element(s) display correctly (e.g., as intended by the user who developed the original or input HTML; such that the output HTML produces similar visual/display characteristics as the original or input HTML, to name two non-limiting examples) in an email client, as depicted by steps 109, 110, 111, and 112. In some cases, the output of this phase (i.e., steps 109-112) may comprise one or more second markup language structure objects (also referred to as second markup language components, or simply EML components/objects), where the second markup language structure object(s) contain a component mapping of each element contained within the original HTML including one or more of the element positioning, CSS, attributes, and properties associated with the visual/display characteristics of the element.

At step 113, the method may comprise converting the second markup language structure object (e.g., second markup language component, EML component) described above into an output HTML that renders in a plurality of email clients, as described below in relation to FIGS. 8-10. In some examples, the output HTML may produce a same or similar visual look/display as the original HTML when rendered in a plurality of email clients. In other words, the output HTML may be designed to render correctly, as the original HTML intended, in one or more of the plurality of email clients. In some examples, this conversion at step 113 may be implemented using one or more second markup language component to HTML-element mapping algorithms (e.g., an EML-component-to-HTML-element mapping algorithm). As defined earlier, EML refers to a component-based custom markup language. In some aspects, the use of a component-based markup language allows the system of the present disclosure to leverage ML and AI techniques to build direct DOM element matching without having to manually write code for every HTML element property, attribute, and/or style combination. It should be noted that, the use of EML and/or AML is not intended to be limiting, and other markup languages known in the art are contemplated in different embodiments. Additionally, or alternatively, the use of two different markup language formats (e.g., first markup language format, second markup language format) in addition to HTML is exemplary only, and not intended to be limiting. In some embodiments, the system of the present disclosure may utilize only one of the first markup language format (e.g., AML) or the second markup language format (e.g., EML).

For instance, the system may convert the input HTML into the first markup language format (e.g., AML), or alternatively, the second markup language format (e.g., EML), remove any unnecessary elements from the HTML structure, and transform the first markup language format or the second markup language format into an output HTML structure. Alternatively, the system may convert the input HTML into a third markup language format different from the first markup language format and the second markup language format, process the data stored in the third markup language format for a plurality of email clients, transform the data stored in the third markup language format into an output HTML structure, and generate the output HTML from the data stored in the third markup language format such that the output HTML renders in a plurality of email clients. It should be noted that, the system may perform steps 111 (i.e., compare, evaluate, iterate) and 112 (i.e., employ machine learning or AI techniques) while transforming the third markup language into the output HTML structure to ensure that the output HTML produces a same or similar visual look/display as the original HTML intended when rendered in a plurality of email clients.

In some examples, the one or more second markup language components may include one or more of interactive components and fallback components. It should be noted that other types of second markup language components are contemplated in different embodiments, and the examples listed herein are not intended to be limiting. As used herein, the term "fallback component" may refer to an alternate email component that may be utilized, e.g., in place of an interactive component, when the interactive email component is not supported by a device, an email client, etc. For instance, an interactive email component (e.g., animated image carousel) may be hidden on a non-supported email client and a separate email component (e.g., a fallback component showing a static image) may be utilized. In some cases, media queries (described below in relation to FIGS. 8 and 9) may be utilized in email HTML to determine which component (e.g., interactive component, fallback component) should be utilized based on the device, operating system, email client, etc., being utilized by a user.

In some circumstances, an input email HTML received from an email marketer (or another user) may not be adapted for displaying uniformly across a plurality of devices, email clients, operating systems, etc. In other words, the input email HTML may not be "responsive". Aspects of this disclosure may relate to automatically generating responsive HTML from input HTML such that the responsive HTML (i.e., output HTML) has the same design, structure, formatting, style, and/or display as the original HTML. In other cases, the input HTML may be "responsive", or may have different content for interactive and fallback content blocks. Oftentimes, email developers inadvertently include additional unnecessary HTML elements in the "responsive" input HTML that play little to no role in the final display structure of the email. Such unnecessary HTML elements, however, do increase the final file size of the email being sent to subscribers, which also increases the computational complexity (e.g., processing power required) for rendering the email HTML. Aspects of this disclosure may relate to automatically generating responsive HTML with a small or adequate "size" footprint by leveraging ML or AI techniques.

In some aspects, the second markup language components serve as an abstraction of a more complex email-responsive HTML layout. In some cases, the one or more second markup language components may be compiled to generate the final, cleaned output HTML. Some non-limiting examples of second markup language components may include head, body, button, text, column, section, and/or interactive components (e.g., accordion, carousel, divider, group, spacer, table, wrapper, navbar, etc.). The second markup language may be component-based, where the components not only abstract complex patterns, but can also be reused. In some embodiments, the second markup language may not only be used as a markup, but also as a JSON object. With the JSON format, a second markup language component may be defined as an object with the following properties (not intended to be limiting): a tagName as a string; a list of attributes as an object; either a "content" as a string or a list of children tags as an array.

Figure 2:
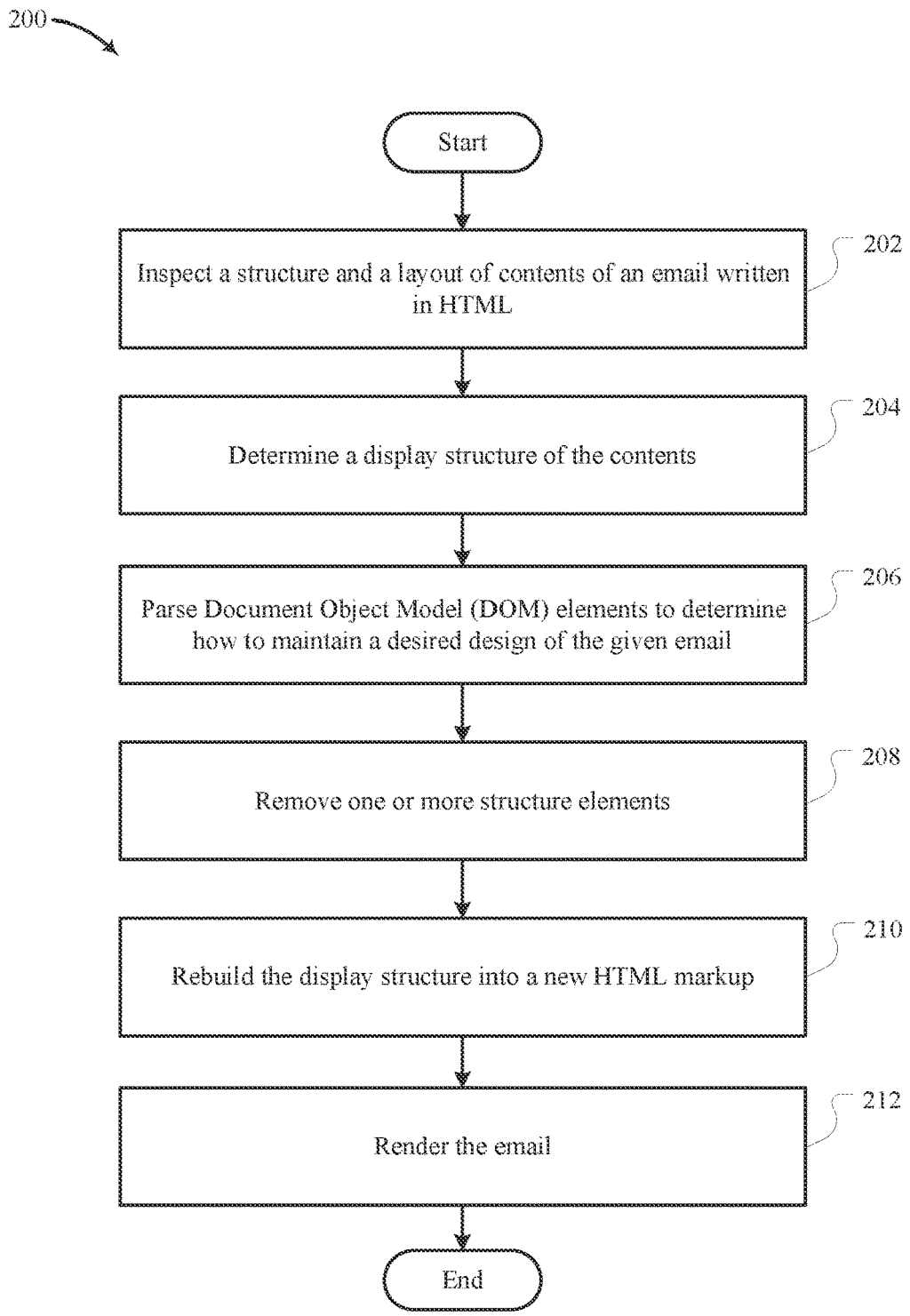
FIG. 2 illustrates a method for rendering and displaying an email, according to various aspects of the disclosure.

FIG. 2 is a flowchart 200 depicting a method for rendering and display emails, according to various aspects of the disclosure. In some cases, the system of the present disclosure analyzes and inspects the original HTML (step 202), determines its display structure (204), parses the DOM elements to determine how to maintain a desired design for the given email (step 206), removes one or more structure elements (e.g., any unnecessary structure elements, such as unnecessary HTML structure elements) (step 208), rebuilds the display structure into a new HTML markup (step 210) such that the new HTML renders as the author intended in one or more email clients, and renders the email in at least one of a plurality of email clients (step 212). In some cases, the flowchart 200 may be implemented using one or more of the systems described herein, such as, computing system 400, computing system 500, and/or system 800, described in relation to the figures below.

As seen, at step 202, the method comprises inspecting a display structure and/or a layout of contents of an email written in HTML (e.g., an input HTML prepared from campaign precheck, shown at step 102 in FIG. 1). Step 202 may be performed by one or more hardware processors configured by machine-readable instructions including a module that is the same as or similar to display structure module 430 in FIG. 4, in accordance with one or more implementations.

At step 204, the method comprises determining a display structure of the contents of the email written in HTML. Step 204 may be performed by one or more hardware processors configured by machine-readable instructions including a module that is the same as or similar to display structure module 430 in FIG. 4, in accordance with one or more implementations.

At step 206, the method comprises parsing one or more Document Object Model (DOM) elements (also referred to as DOM node elements), which may help the system in determining how a desired design of the given email may be maintained. In other words, parsing the one or more DOM elements (or DOM node elements) may facilitate in ensuring that the output HTML (i.e., produced at step 210 described below), when rendered, has similar or substantially similar visual/display characteristics as the original HTML. Step 206 may be performed by one or more hardware processors configured by machine-readable instructions including a module that is the same as or similar to DOM module 536 in FIG. 5, in accordance with one or more implementations.

At step 208, the method comprises removing one or more structure elements from the input HTML. In some cases, the input HTML may comprise one or more unnecessary structure elements that can be removed without affecting the final look/display of the email. Further, one or more of these unnecessary structure elements may cause an email to have rendering issues when displayed in one or more email clients, which may adversely impact user experience. To alleviate such issues, the system of the present disclosure may be configured to identify one or more unnecessary structure elements that can be removed from the input HTML such that the output HTML still renders and displays correctly across a plurality of email clients. In such cases, the output HTML (i.e., generated from the input HTML) may not comprise the one or more structure elements that were removed by the system. Step 208 may be performed by one or more hardware processors configured by machine-readable instructions including a module that is the same as or similar to structural element removal module 538 in FIG. 5, in accordance with one or more implementations.

At step 210, the method comprises rebuilding the display structure into a new or output HTML markup (i.e., an output HTML file or document). As noted above, the new or output HTML markup may comprise a similar or substantially similar visual design as the input/original HTML when rendered in one or more email clients. Step 210 may be performed by one or more hardware processors configured by machine-readable instructions including one or more module(s) that are the same as or similar to display structure module 430, rendering module 440, display structure module 530, display structure rebuild module 537, and/or rendering module 540 in FIGS. 4 and/or 5, in accordance with one or more implementations.

At step 212, the method comprises rendering the email using the output HTML file or document generated at step 210. In some cases, the email may be rendered and displayed on at least one email client of at least one user device (e.g., computing device 810 in FIG. 8). Step 212 may be performed by one or more hardware processors configured by machine-readable instructions including a module that is the same as or similar to rendering module 440 and/or rendering module 540 in FIGS. 4 and/or 5, in accordance with one or more implementations.

Figure 4:
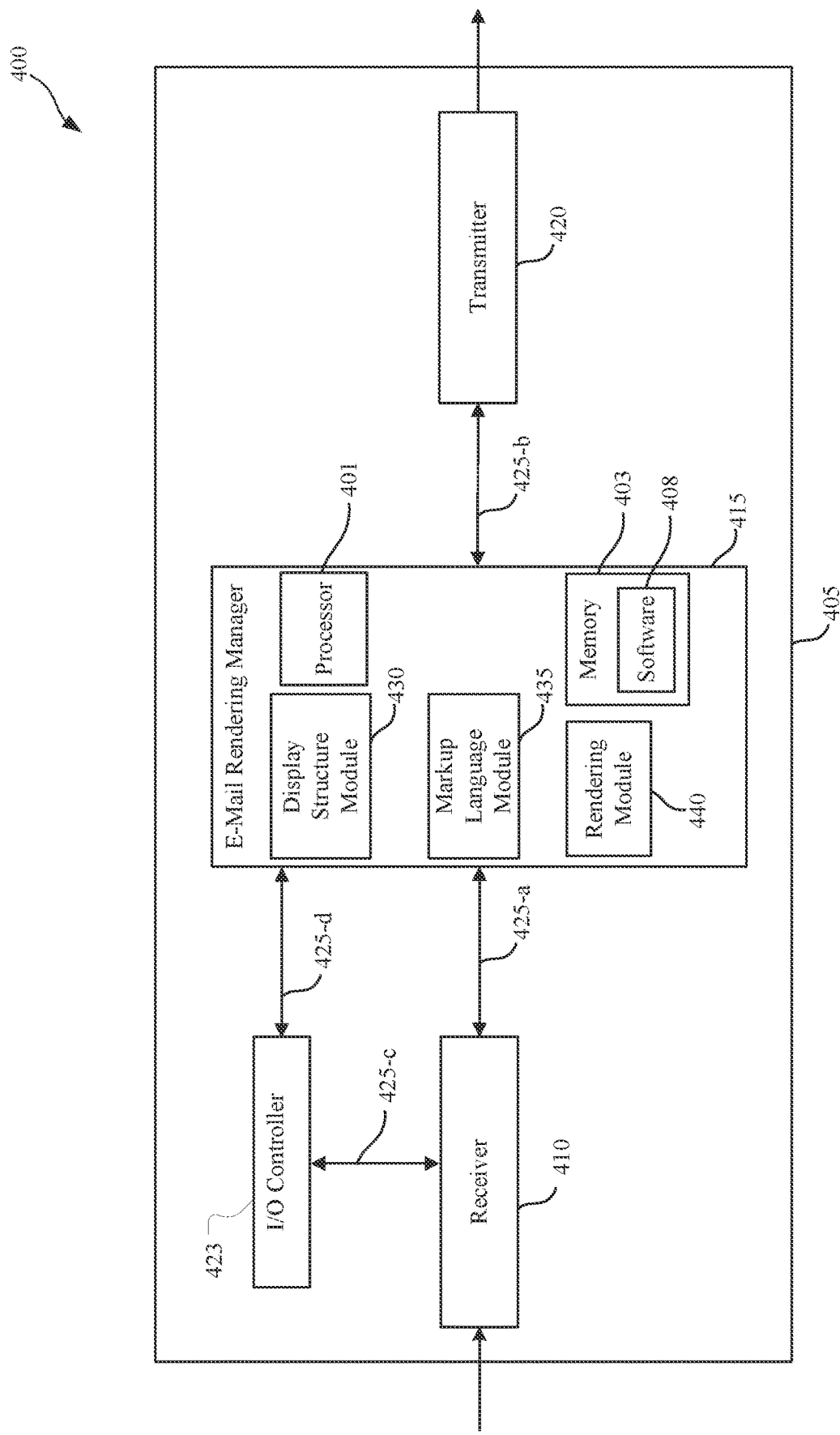
FIG. 4 illustrates a block diagram of a computing system for rendering and displaying an email, according to various aspects of the disclosure.

FIG. 4 illustrates a block diagram 400 of a computing system 405 for rendering and displaying emails, according to various aspects of the disclosure. Computing system 405 may include a receiver 410, an e-mail rendering manager 415, and a transmitter 420. Computing system 405 may also include a processor 401, a memory 403, a software 408, and an input/output (I/O) controller 423. Memory 403 may include random access memory (RAM) read only memory (ROM). The memory 403 may store computer-readable, computer-executable software 408 including instructions that, when executed, cause the processor to perform various functions described herein. In some cases, the memory 403 may contain, among other things, a basic input/output system (BIOS) which may control basic hardware and/or software operation such as the interaction with peripheral components or devices. Software 408 may include code to implement aspects of the present disclosure, including code to support rendering and displaying of email(s) across a plurality of email clients. Software 408 may be stored in a non-transitory computer-readable medium such as system memory or other memory. In some cases, the software 408 may not be directly executable by the processor but may cause a computer (e.g., when compiled and executed) to perform functions described herein. Each of these components of computing system 405 may be in communication with one another (e.g., via one or more buses, such as buses 425-a, 425-b, 425-c, 425-d). In some cases, the receiver 410 and the transmitter 420 may collectively be referred to as a transceiver.

In some cases, the e-mail rendering manager comprises one or more modules, such as a display structure module 430, a markup language module 435, and a rendering module 440. The modules may be embodied in hardware, software, or a combination thereof. In some cases, the display structure module 430 may be configured to inspect a display structure and/or a layout of contents of an email written in HTML (e.g., an input HTML prepared from campaign precheck, shown at step 102 in FIG. 1). In some cases, inspecting the display structure and layout of contents of the email may comprise inspecting one or more of rows, columns, HTML elements, CSS styles, image nodes, text nodes, and/or media queries, to name a few non-limiting examples. In some cases, the input HTML may be received by the receiver 410, for instance, from a database of an email pre-deployment platform. Further, the display structure module 430 may be configured to determine a display structure of the contents of the email written in HTML.

In some examples, the markup language module 435 may be configured to create a first custom markup language structure associated with the input HTML by walking (or traversing) a DOM tree to determine Cascading Style Sheets (CSS) inheritance and/or CSS styles directly defined within one or more of the DOM elements. It is contemplated that creating the first markup language structure may further comprise finding one or more first markup language blocks in the input HTML, where the first markup language blocks include style specific information (e.g., HTML elements, such as table(s), div(s); CSS elements or styles).

Further, the markup language module 435 may be configured to convert a first object (e.g., a JSON object) into the first markup language structure/format. In some cases, the input HTML may be converted into the first object (e.g., JSON object, JSON string) prior to converting the first object (e.g., JSON object) into the first markup language structure. In some instances, the markup language module 435 may be further configured to translate the first markup language structure into a second markup language structure.

For example, the markup language module 435 may be configured to translate a plurality of first markup language blocks (e.g., AML blocks) into a plurality of second markup language components (e.g., EML components). In some embodiments, translating the first markup language to the second markup language may comprise using an artificial intelligence (AI) or machine learning (ML) algorithm to map the input HTML to the second markup language.

In some embodiments, the processor 401 may include an intelligent hardware device (e.g., a general-purpose processor, a digital signal processor or DSP, a central processing unit or CPU, a microcontroller, an ASIC, an FPGA, a programmable logic device, a discrete gate or transistor logic component, a discrete hardware component, or any combination thereof). In some cases, processor 401 may be configured to operate a memory array using a memory controller. In other cases, a memory controller may be integrated into processor 401. Processor 401 may be configured to store computer-readable instructions stored in a memory to perform various functions (e.g., functions or tasks supporting rendering and displaying emails in a plurality of email clients). In some cases, the transmitter 420 may transmit signals generated by other components of the device. In some examples, the transmitter 420 may be collocated with the receiver 410 in a transceiver module. While not shown, the receiver 410 and/or the transmitter 420 may include a single antenna, or a set of antennas.

Figure 5:
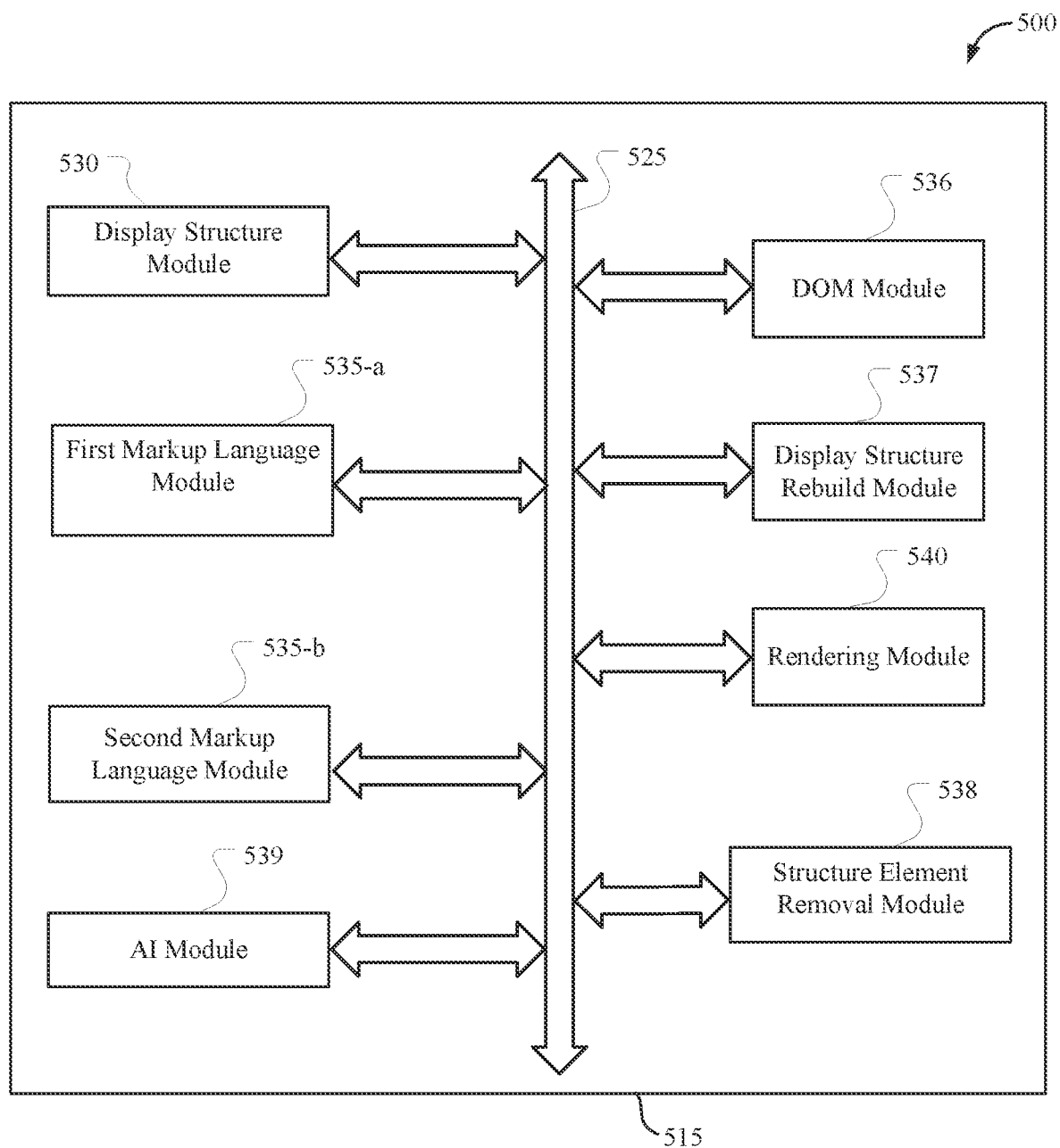
FIG. 5 illustrates a block diagram of an e-mail rendering manager of the computing system in FIG. 4, according to various aspects of the disclosure.

FIG. 5 illustrates a block diagram 500 of an email rendering manager 515 (also shown as email rendering manager 415 in FIG. 4), according to various aspects of the disclosure. The email rendering manager 515 may be similar or substantially similar to the email rendering manager 415 previously described in relation to FIG. 4. Additionally, or alternatively, the email rendering manager 515 may be similar or substantially similar to the email rendering manager 815 described below in relation to FIG. 8.

As seen, the email rendering manager 515 comprises one or more modules, such as a display structure module 530, a first markup language module 535-a, a second markup language module 535-b, an AI module 539, a DOM module 536, a display structure rebuild module 537, a rendering module 540, and a structure element removal module 538. One or more of the modules depicts in FIG. 5 may be optional. Alternatively, one or more of the modules may be implemented using a single module. For instance, in one non-limiting examples, the first and second markup language module 535-a and 535-a may be implemented using a single module (e.g., shown as markup language module 435 in FIG. 4). While not shown, the email rendering manager 515 may further include a processor (e.g., shown as processor 401 in FIG. 4), a memory (e.g., shown as memory 403 in FIG. 4), a software (e.g., shown as software 408 in FIG. 4), and an input/output (I/O) controller (e.g., shown as I/O controller 423 in FIG. 4). Memory may include random access memory (RAM) and/or read only memory (ROM). The memory may store computer-readable, computer-executable software including instructions that, when executed, cause the processor to perform various functions described herein. In some cases, the memory may contain, among other things, a basic input/output system (BIOS) which may control basic hardware and/or software operation such as the interaction with peripheral components or devices. Software may include code to implement aspects of the present disclosure, including code to support rendering and displaying of emails for a plurality of email clients. Software may be stored in a non-transitory computer-readable medium such as system memory or other memory. In some cases, the software may not be directly executable by the processor but may cause a computer (e.g., when compiled and executed) to perform functions described herein. Each of these components of email rendering manager 515 may be in communication with one another via one or more buses 525. In some cases, the email rendering manager may be electronically, logistically, and/or communicatively coupled to a receiver (e.g., shown as receiver 410 in FIG. 4) and a transmitter (e.g., shown as transmitter 420 in FIG. 4). In some examples, the receiver and the transmitter may collectively be referred to as a transceiver.

In some cases, the display structure module 530 may be configured to inspect a structure and/or a layout of contents of an email written in HTML (e.g., an input HTML prepared from campaign precheck, shown at step 102 in FIG. 1). In some cases, inspecting the structure and layout of contents of the email may comprise inspecting one or more of rows, columns, HTML elements, CSS styles, image nodes, text nodes, and/or media queries, to name a few non-limiting examples. In some cases, the input HTML may be received by the receiver, for instance, from a database of an email pre-deployment platform. Further, the display structure module 530 may be configured to determine, based on the inspecting, a display structure of the contents of the email written in HTML.

In some examples, the DOM module 536 may be configured to parse DOM elements to determine how to maintain a desired visual/aesthetic design of the email. In some cases, one or more of CSS inheritance and/or CSS styles may be directly defined within one or more of the DOM elements.

In some examples, the first markup language module 535-a may be configured to create a first custom markup language structure associated with the input HTML by walking (or traversing) a DOM tree to determine Cascading Style Sheets (CSS) inheritance and/or CSS styles directly defined within one or more of the DOM elements. Further, the first markup language module 535-a (or another module of the email rendering manager 515) may be configured to convert a first object (e.g., JSON object) into the first markup language structure. In some cases, the input HTML may be converted into the first object (e.g., JSON object) prior to converting the JSON object into the first markup language structure.

In some instances, the first markup language module 535-a, or alternatively, the second markup language module 535-b, may be further configured to translate the first markup language structure into a second markup language structure. For example, the first markup language module 535-a (or the second markup language module 535-b) may be configured to translate a plurality of first markup language blocks (e.g., AML blocks) into a plurality of second markup language components (e.g., EML components). In some embodiments, translating the first markup language to the second markup language may comprise using an artificial intelligence (AI) or machine learning (ML) algorithm to map the input HTML to the second markup language.

In some cases, the structure element removal module 538 may be configured to remove one or more structure elements of the input HTML prior to (or during) translation from the first markup language to the second markup language. In some cases, the structure element removal module 538 may work in conjunction with one or more of the other modules of the email rendering manager, such as the AI module 539, display structure rebuild module 537, DOM module 536, rendering module 540, and/or first and second markup language modules 535. The structure element removal module 538 may be configured to identify one or more unnecessary structure elements in the input HTML, or alternatively, in the first markup language (e.g., AML blocks derived from the input HTML). As used herein, the term "unnecessary structure element" refers to a structure element in the input HTML that plays no role (or alternatively, is redundant) with regards to the final visual/aesthetic design of the email. Said another way, a structure element may be referred to as "unnecessary" if the final visual/aesthetic design of the email is the same or substantially the same irrespective of the presence or absence of the structure element. As an example, if an input HTML comprises a <header> structural element but lacks any text/content within the <header> structural element, the <header> structure element may be termed as an "unnecessary structure element". In this case, the structure element removal module 538 may remove the <header> structure element as its removal would not affect how the email renders.

The display structure rebuild module 537 may be configured to rebuild the display structure (e.g., associated with the input HTML, the first markup language, and/or the second markup language) into a new HTML markup (also referred to as the output HTML). As noted above, the new or output HTML markup may comprise a similar or substantially similar visual design as the input/original HTML when rendered in one or more email clients.

Rendering module 540 may be configured to render the email using the output HTML. In some cases, the email may be rendered and displayed on at least one email client of at least one user device (e.g., user device 810 in FIG. 8).

FIG. 6 illustrates an example of a Document Object Model (DOM) tree 600, in accordance with one or more implementations. In some cases, the DOM refers to a cross-platform and language-independent interface that treats an HTML document as a tree structure, where each node is an object representing a part of the document. In some cases, the DOM represents a document (e.g., HTML document) with a logical tree.

In some aspects, tags (e.g., HTML tags) may represent the backbone of an HTML document. According to the DOM, every HTML tag (e.g., <body> tag, <head> tag, <title> tag, etc.) may be represented as an object. Further, nested tags are "children" of the enclosing tag (i.e., parent tag). Additionally, the text/content inside a tag may also be represented as an object. In some cases, one or more of these objects in an HTML document may be accessible, for instance, using JavaScript (or another object-oriented programming language). Further, a web page or an email may be modified based on accessing these objects.

As seen, the DOM tree 600 may be used to represent an HTML document as a tree structure of tags. In this example, each tree node is an object. Further, tags are element nodes (or simply elements) and form the tree structure. For instance, <html> is the root element and <head> and <body> are its children. As seen, the <head> and <body> elements node further comprise child nodes, shown as <title> tag, <h1> tag (used to define a header), and <a> tag (used to define a hyperlink). Here, the text (e.g., "My Title" or "A heading") inside the head and body elements, respectively, form text nodes. In some cases, a text node may only contain a string and it may not have children. Typically, text nodes are always a "leaf" of the DOM tree 600. As shown, the <body> element further comprises a child node, i.e., <a> tag, used to define a hyperlink. In this case, the <a> element comprises an attribute (href attribute, which indicates the link's destination) and a text node (e.g., "Link Text").

FIG. 7 illustrates another example of a DOM tree 700, in accordance with one or more implementations. In some examples, DOM tree 700 implements one or more aspects of the DOM tree 600 previously described in relation to FIG. 6. As seen, the DOM tree 700 comprises multiple nodes, including a root node (e.g., Document), a plurality of element nodes (e.g., <HTML> element node, which is the root or parent node of <head> and <body> elements; <head> element, which is a parent of <title> element; <body> element, which is a parent of <h1> and <script> elements; <title> element; <h1> element; <script> element), a plurality of text nodes (e.g., text nodes depicted by "My Title", "My Header", and "alert( )"), and one or more attribute nodes (e.g., attribute node represented by "text/JavaScript").

According to aspects of the present disclosure, the system may inspect a structure and a layout (e.g., rows, columns, HTML elements, CSS styles) of contents (e.g., text nodes comprising text and/or alphanumeric characters, hyperlinks, email addresses, image nodes, media queries, etc.) of an email written in HTML. In some cases, the system then determines a display structure of the contents of the email. The HTML document associated with the email may be represented using a DOM tree, as described above in relation to FIGS. 6 and 7. The system may parse the DOM elements (e.g., element nodes) of the DOM tree to determine how the desired design of the email may be maintained, while at the same time removing any unnecessary structure elements from the input HTML. In some embodiments, the parsing the DOM elements may comprise traversing or walking the DOM tree created by parsing the input HTML to determine CSS inheritance and/or CSS styles directly defined within one or more of the DOM elements. In some embodiments, the HTML DOM may be converted into a JSON object. In other words, the system may create a JSON object containing HTML DOM, where the JSON object may encompass the DOM properties of the element nodes. Using the object model (i.e., DOM), JavaScript may be able to perform operations on HTML, such as modifying or changing HTML elements, HTML attributes, CSS styles, removing existing HTML elements and attributes, and adding new HTML elements and attributes, to name a few non-limiting examples. In some embodiments, the HTML DOM associated with the display of the HTML elements of the email may be parsed into element node and leaf objects of one or more JSON object(s). Further, the system may create a first markup language structure (e.g., AML blocks) using the one or more JSON object(s). As described above in relation to FIG. 1, the system may parse each DOM Node Element contained in the JSON object(s) to determine the CSS style(s), CSS inheritance(s), and/or and display of each HTML element.

Figure 8:
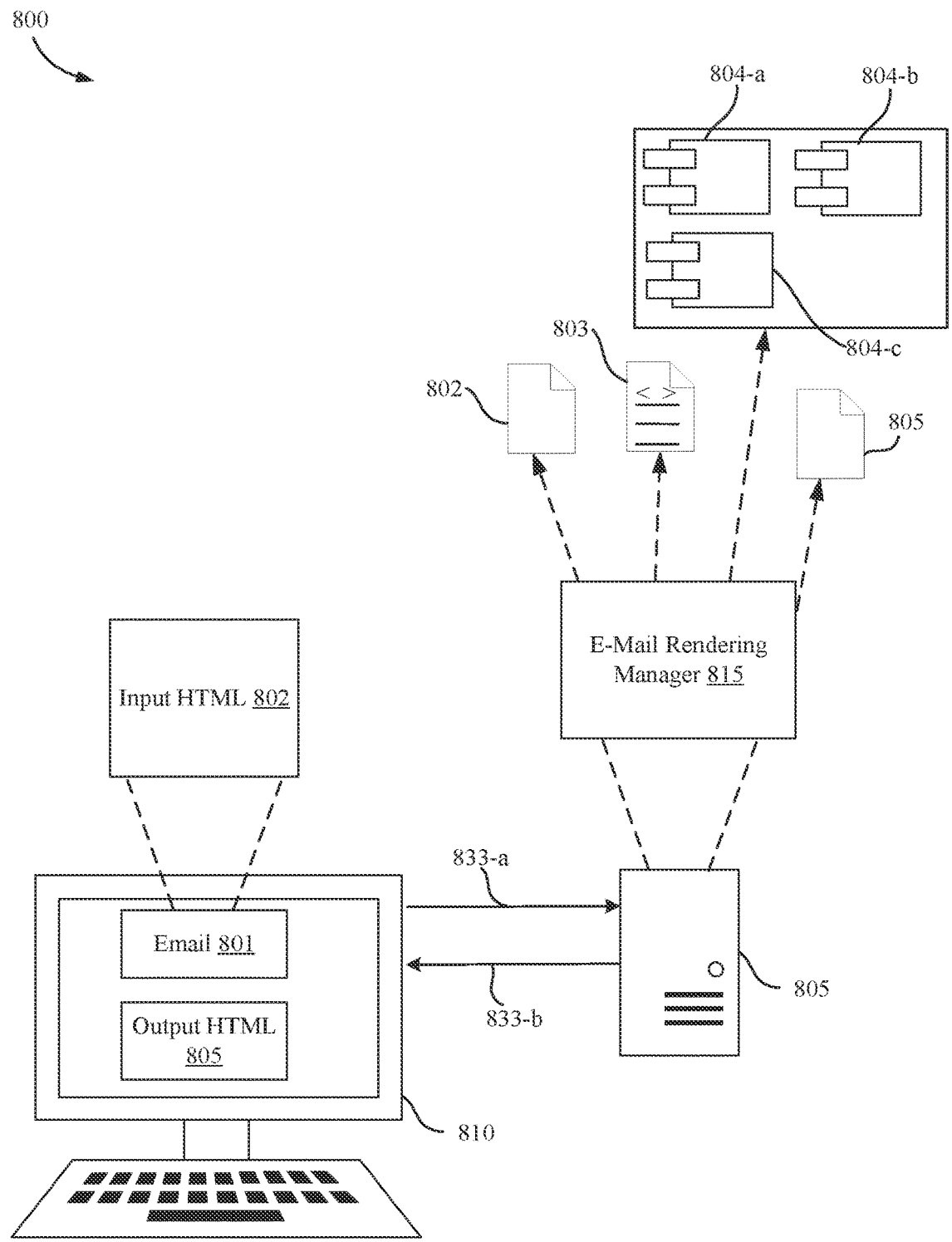
FIG. 8 illustrates an example of a system for rendering and displaying an email, according to various aspects of the disclosure.

FIG. 8 illustrates an example of a system 800 for rendering and displaying emails, according to various aspects of the disclosure. As seen, the system 800 comprises a computing system 805 (e.g., a server 805) and a user device 810. The computing system 805 may further comprise an e-mail rendering manager 815. The e-mail rendering manager 815 implements one or more aspects of the e-mail rendering manager 415 and/or 515, previously described in relation to FIGS. 4 and/or 5. In some examples, the computing system 805 may be in communication (e.g., over a wireless communication link, depicted by links 833-a and 833-b) with the user 810 for bi-directional exchange data, such as internet packet data. In some cases, the computing system 805 may receive an input HTML (e.g., email HTML associated with an email 801 drafted by a user) of the user device 810 over communication link 833-a. The e-mail HTML may be received by a receiver (e.g., shown as receiver 410 in FIG. 4) of the computing system 805 and passed on to the e-mail rendering manager 815 using one or more buses (e.g., shown as buses 425 in FIG. 4). Next, the e-mail rendering manager 815 may perform one or more of the processes and methods described herein, including at least in relation to FIGS. 1, 2, 4, and/or 5, to rebuild the display structure associated with the input HTML into a new or output HTML. The computing system 805 may then transmit the output HTML to the user device 810, as shown by output HTML 805. In some cases, the output HTML 805 may have similar or substantially visual/display characteristics as the input HTML 802 (or email 801), when rendered.

In this example, the e-mail rendering manager 815 may receive the email 801 comprising input HTML 802, where the input HTML 802 may include a plurality of HTML elements, the HTML elements comprising tags, content, etc. The email HTML may also include styling information, for instance, CSS. CSS may be added to HTML documents in one or more ways, for instance, inline (e.g., using the 'style attribute' inside HTML elements), internal (e.g., by using a 'style' element in the <head> section), or external (e.g., using a <link> element to link to an external CSS file). After the e-mail rendering manager receives the input HTML 802, it identifies one or more of ID attributes, div tags, CSS styles, CSS elements, etc., by parsing the input HTML 802. The email rendering manager 815 stores the styling information (e.g., the one or more ID attributes, div tags, CSS styles, CSS elements, etc.) into one or more first markup language blocks 803. Additionally, or alternatively, the email rendering manager parses the input HTML 802 to create a Document Object Model (DOM) tree with node/leaf objects (e.g., also shown as step 1006 in FIG. 10). Said another way, the email rendering manager separates the content and other non-styling related information in the input HTML from the styling related information to isolate the first markup language blocks 803.

As noted above, an email HTML may include a plurality of components (e.g., interactive components, fallback components, rows, columns, HTML elements, CSS styles, images, text, media queries, etc.) that dictate the structure and layout of contents of the email. To ensure that an email looks and displays, as intended, regardless of device type, operating system, email client, etc., the output HTML may need to be designed with these variable factors in mind. According to aspects of this disclosure, a second markup language may be provided, where the second markup language is component based. In some embodiments, the second markup language may utilize similar, but not necessarily identical, syntax as HTML. Further, the second markup language may be converted (or transformed) into HTML and vice-versa. For instance, a file storing data in the second markup language may be transformed to HTML and the transformed output may be written to an output HTML file. In some instances, this output HTML file may include a cleaned and simplified HTML structure (i.e., as compared to the input HTML file) and may be compatible for display across a plurality of email clients. In other words, regardless of device type, operating system, etc., the output HTML file may render in the same (or substantially) manner as the input HTML.

The email rendering manager 815 processes the first markup language blocks 803 to create one or more second markup language components 804 (e.g., second markup language component 804-a through c). In some cases, each HTML element in the input HTML may have a correlating second markup language component of the one or more second markup language components 804. The second markup language components 804 may be converted or transformed into responsive HTML, which may allow the display characteristics of the original HTML to be generally preserved irrespective of email client, device type, etc. In this way, aspects of the present disclosure may allow an email developer to provide an email template (e.g., input HTML), where the email template may or may not be specific to a particular device (e.g., smartphone, tablet, laptop), an operating system (e.g., iOS by APPLE, ANDROID by GOOGLE, etc.), and/or an email client (e.g., OUTLOOK by MICROSOFT, GMAIL by GOOGLE, etc.), and receive a responsive output HTML (e.g., output HTML 805). In other cases, an email developer may utilize the system of the present disclosure to develop the email using the second markup language, transform the data in the second markup language to HTML, and store the output HTML for use in an email campaign.

After the email rendering manager has converted and transformed the second markup language into the output HTML 805, it transmits a file containing the output HTML 805 to the computing device 810 over communication link 833-*b*. This output HTML 805 may be rendered using one or more of a plurality of email clients (or email service providers) running on different operating systems, computing devices, etc.

Figure 9:
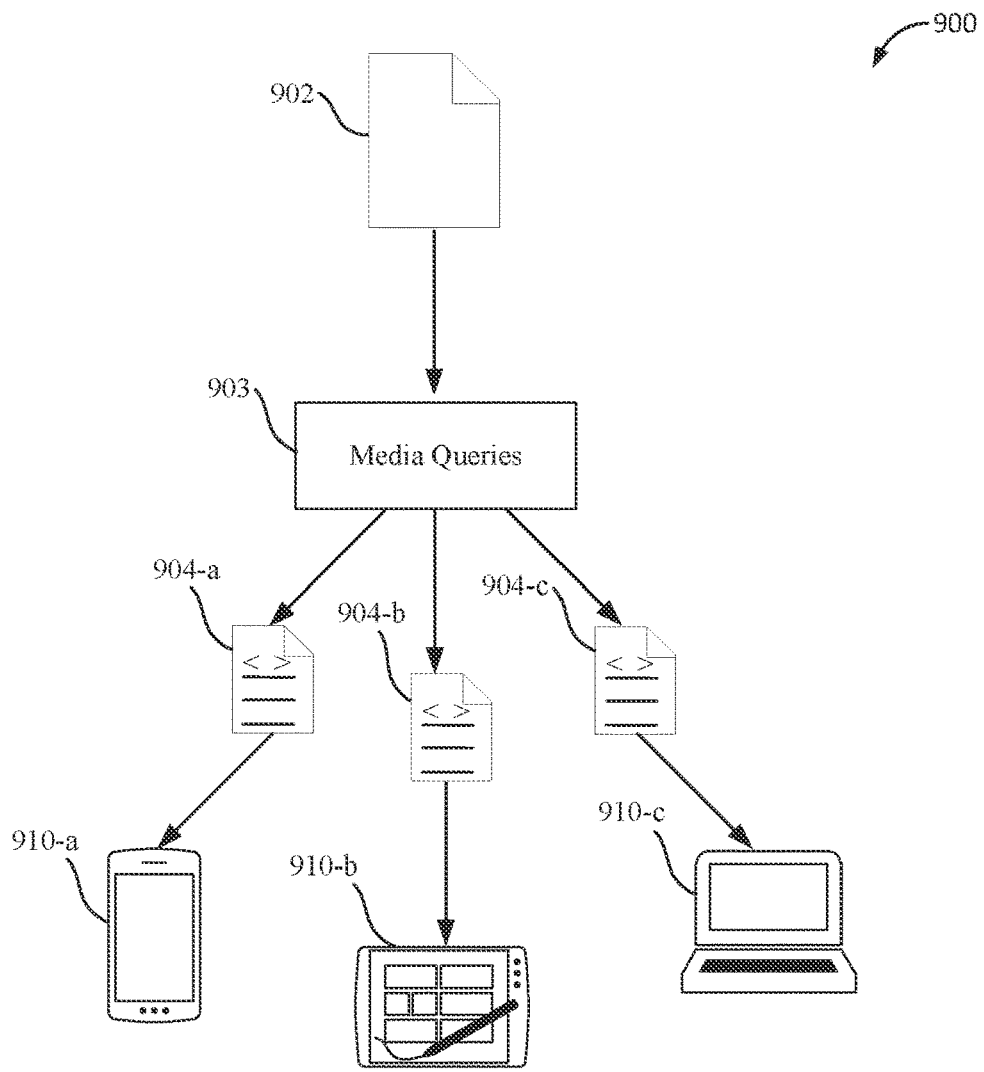
FIG. 9 illustrates a visual depiction related to the use of media queries for rendering and displaying an email on a plurality of user devices, in accordance with one or more implementations.

FIG. 9 illustrates a visual representation 900 directed to the use of media queries in email HTML, in accordance with one or more implementations. In the example shown, a file 902 containing email HTML may include media queries 903, where the media queries may be utilized to target certain display resolutions, specific email clients, certain screen widths, etc., which may allow the email HTML to render (as intended) on multiple email clients and/or device types. As previously described, media queries may contain any number of optional expressions that may limit when the query will trigger, such as width, pixel density, orientation, a specific email client, etc., and may allow email content to be customized, or alternatively, adjusted for different presentation mediums. In one non-limiting example, the media query may include a max-width, and at any width less than the max-width specified, all of the CSS within the media query may take effect. As seen, the email HTML 902 may further include different styling information 904 (e.g., CSS styles, CSS elements, ID attributes, div tags, etc.) for different types of user devices (e.g., user device 910-*a* or a smartphone, user device 910-*b* or a tablet, user device 910-*c* or a laptop). In such cases, the styling information 904 (e.g., CSS styles) used for rendering the email on a user device may be based on the user device identified through the media query 903. In other words, styling information 904-*a* may be used if the user device is identified as a smartphone (e.g., user device 910-*a*), styling information 904-*b* may be used if the user device is identified as a tablet (e.g., user device 910-*b*), and styling information 910-*c* may be utilized if the user device is identified as a laptop (e.g., user device 910-*c*).

According to aspects of this disclosure, the system may automatically generate styling information for different types of media queries 903 based on determining the display structure and layout of contents of an email written in HTML. For instance, the system of the present disclosure may create the second markup language component(s) such that each component (e.g., interactive component, rows, columns, buttons, etc.) in the original HTML may be supported for a plurality of email clients.

Figure 10:
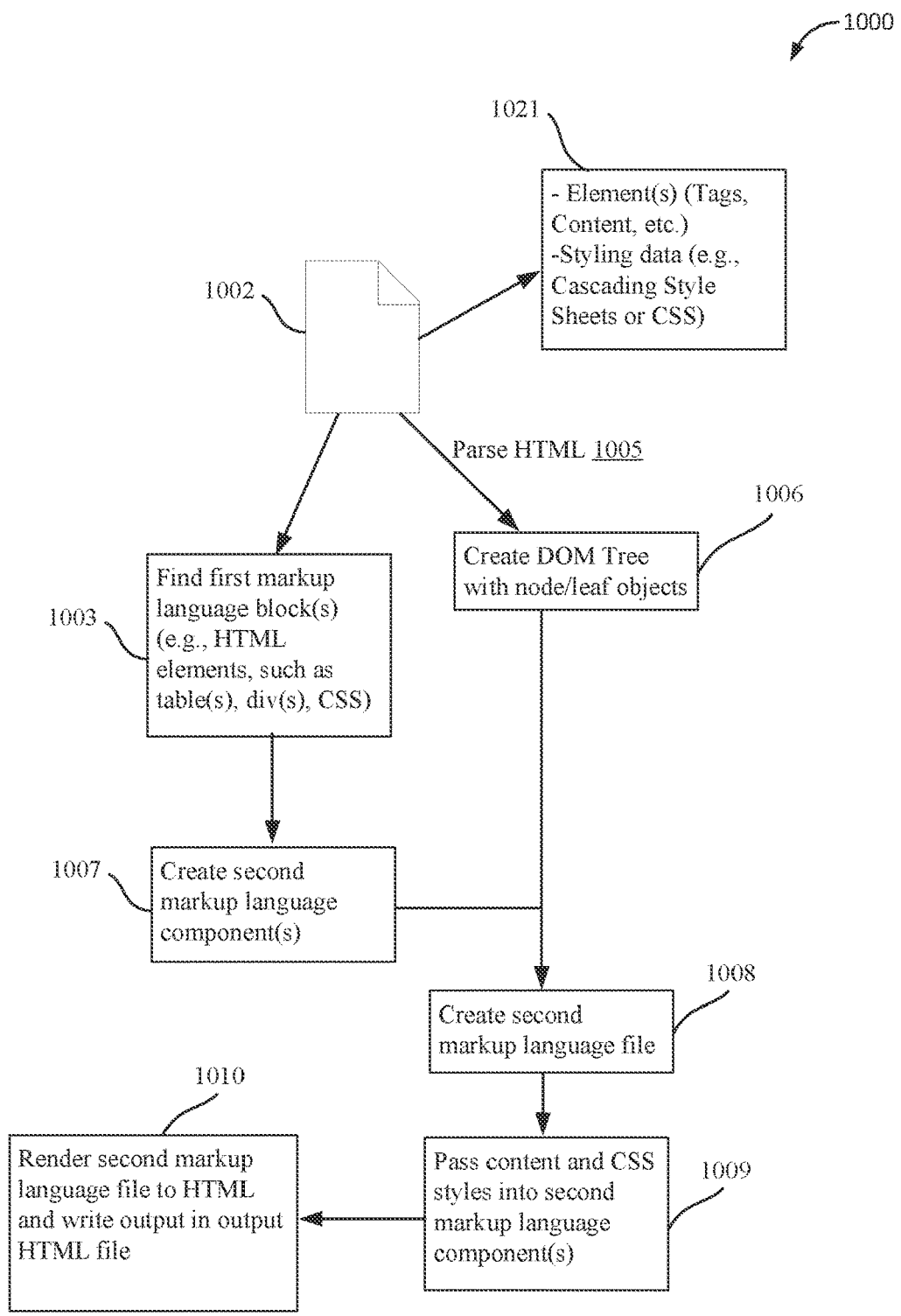
FIG. 10 illustrates a process flow for rendering and displaying an email, according to various aspects of the disclosure.

FIG. 10 illustrates a process flow 1000 for rendering and displaying an email, according to an alternate embodiment of the disclosure. The process flow 1000 may be implemented using one or more of the systems described herein, including at least computing system 405, computing system 505, and/or computing system 805, described in relation to FIGS. 4, 5, and/or 8.

As seen, a file 1002 containing input HTML 1021 may be received by the system of the present disclosure. The input HTML 1021 may comprise a plurality of HTML elements (e.g., tags, content) and styling data (e.g., CSS styles, CSS elements) for rendering the input HTML in at least one email client. In some examples, the system of the present disclosure parses the input HTML at step 1005 and creates a DOM tree with node/leaf objects at step 1006, as previously described in relation to the figures above. At step 1006, the system may also find a plurality of first markup language blocks (e.g., AML blocks) based on analyzing the input HTML and/or the DOM tree, where the first markup language blocks may include one or more of HTML elements (e.g., table(s), div(s), etc.), CSS styles, and CSS elements.

At step 1007, the system may create a plurality of second markup language components by processing the plurality of first markup language blocks. At step 1008, the system may create a second markup language file (i.e., a file having the second markup language format), where the second markup language file includes the plurality of second markup language components. As noted above, the second markup language components may be mapped to the components in the input HTML file. For instance, if the input HTML file includes a "button" component, the second markup language file may also include an equivalent "button" component; if the input HTML file includes an "image carousel" component, the second markup language file may also include an equivalent "image carousel" component. It should be noted that, the input HTML file may or may not be designed to be responsive. However, the second markup language file may be designed to produce a responsive HTML that renders correctly in a plurality of email clients. In other words, the second markup language file may produce HTML that resizes/zooms appropriately when used on either mobile or desktop devices, utilizes a fallback component (e.g., a static image) when an email client does not support an interactive component (e.g., image carousel), uses light colored font when a user is using "dark mode", to name a few non-limiting examples. At step 1009, the system passes the content (e.g., main body/text of email) of the input HTML and/or CSS styles into the second markup language components. In some aspects, the use of the second markup language components serves to simplify the design and complexity of generating responsive HTML.

At step 1010, the system transforms/converts the second markup language to HTML and writes the output in an output HTML file. This output HTML file may be designed to have similar or substantially similar display characteristics across a plurality of email clients, device types, etc., and may generally preserve the stylistic features, display structure, and/or layout of the original input HTML.

Figure 11:
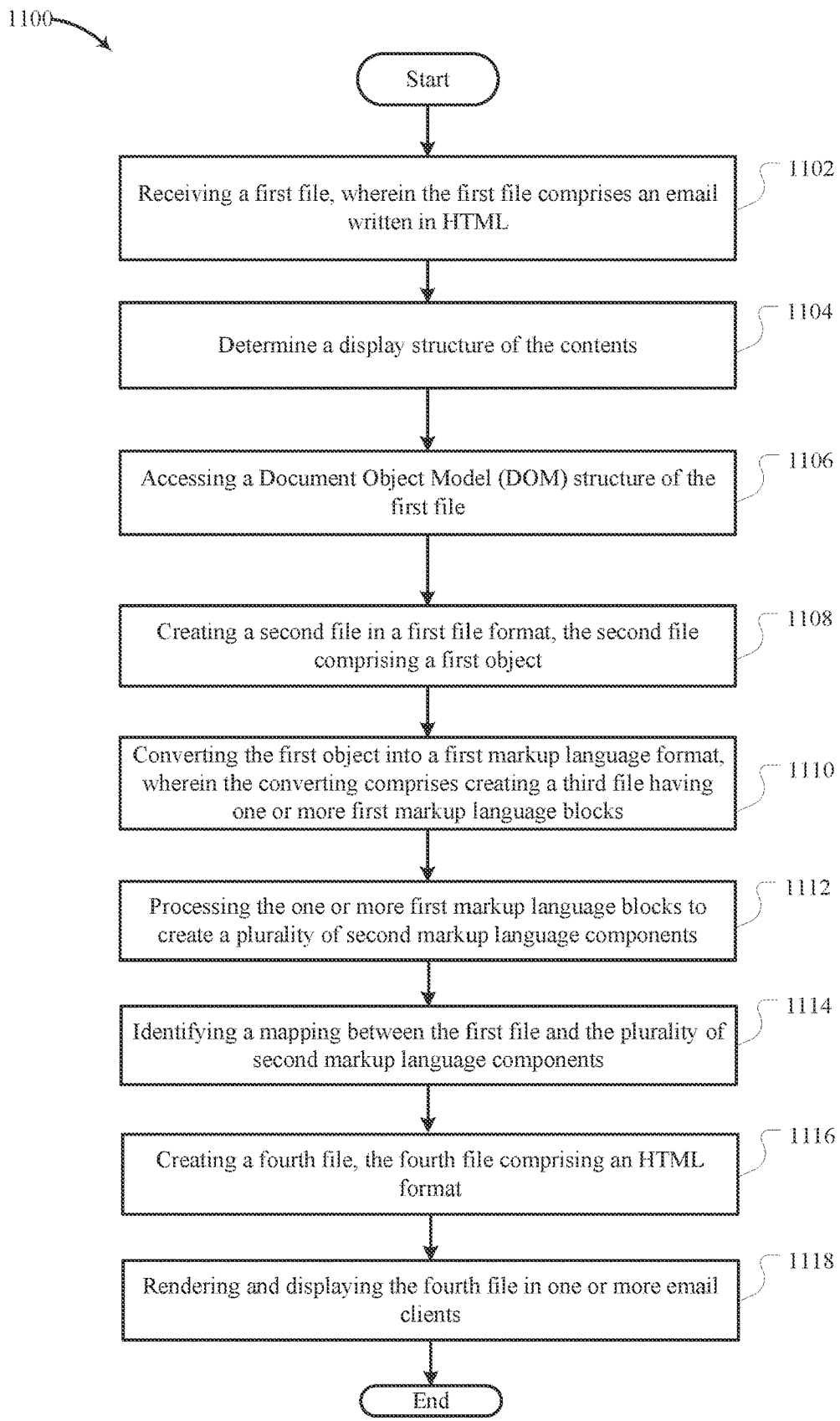
FIG. 11 illustrates a method for rendering and displaying emails, in accordance with one or more implementations.

FIG. 11 illustrates a method 1100 for rendering and displaying an email, in accordance with one or more implementations. The operations of method 1100 presented below are intended to be illustrative. In some implementations, method 1100 may be accomplished with one or more additional operations, and/or without one or more of the operations discussed. Additionally, the order in which the operations of method 1100 are illustrated in FIG. 11 and described below is not intended to be limiting.

Method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100. Additionally, various modules are referred to with respect to the method 1100 and with respect to other figures. It is contemplated that all or part of such modules may be incorporated in various elements (e.g., email rendering manager 415, email rendering manager 515.) or as parts of other modules or other features as described herein.

A first operation 1102 may comprise receiving a first file, wherein the first file comprises an e-mail written in Hypertext Markup Language (HTML), the email comprising one or more contents and one or more tags. First operation 1102 may be performed by one or more hardware processors configured by machine-readable instructions including a module that is the same as or similar to receiver 410 and display structure module 430 in FIG. 4, in accordance with one or more implementations.

Second operation 1104 may include determining a display structure of the contents of the email written in HTML. Second operation 1104 may be performed by one or more hardware processors configured by machine-readable instructions including a module that is the same as or similar to display structure module 430 in FIG. 4, in accordance with one or more implementations.

Third operation 1106 may include accessing a Document Object Model (DOM) structure of the first file, wherein the DOM structure comprises a root node and one or more nodes, each of the one or more nodes associated with at least one of the one or more contents and the one or more tags. Third operation 1106 may be performed by one or more hardware processors configured by machine-readable instructions including a module that is the same as or similar to DOM module 536 in FIG. 5, in accordance with one or more implementations.

Fourth operation 1108 may include creating a second file in a first file format, wherein the second file comprises a first object, and wherein the second file is created by parsing the DOM structure comprising the root node and the one or more nodes into the first object. Fourth operation 1108 may be performed by one or more hardware processors configured by machine-readable instructions including a module that is the same as or similar to first markup language module 535-*a*, structure element removal module 538, DOM Module 536, and/or rendering module 540 in FIG. 5, in accordance with one or more implementations.

Fifth operation 1110 may include converting the first object into a first markup language format, wherein the converting comprises creating a third file in the first markup language format, the third file comprising one or more first markup language blocks. Fifth operation 1110 may be performed by one or more hardware processors configured by machine-readable instructions including a module that is the same as or similar to first markup language module 535-*a* in FIG. 5, in accordance with one or more implementations.

Sixth operation 1112 may include processing the one or more first markup language blocks in the third file to create a plurality of second markup language components in a second markup language format. Sixth operation 1112 may be performed by one or more hardware processors configured by machine-readable instructions including a module that is the same as or similar to first markup language module 535-*a* and/or second markup language module 535-*b* in FIG. 5, in accordance with one or more implementations. Additionally, or alternatively, sixth operation 1112 may be performed by a module that is the same as or similar to markup language module 435 in FIG. 4, in accordance with one or more implementations.

Seventh operation 1114 may include identifying a mapping between the first file and the plurality of second markup language components. Seventh operation 1114 may be performed by one or more hardware processors configured by machine-readable instructions including a module that is the same as or similar to AI module 539 and/or second markup language module 535-*b* in FIG. 5, in accordance with one or more implementations.

Eighth operation 1116 may include creating a fourth file, the fourth file comprising an HTML format, wherein the fourth file is created based on the mapping. Eighth operation 1114 may be performed by one or more hardware processors configured by machine-readable instructions including a module that is the same as or similar to structure element removal module 538, display structure rebuild module 537, and/or second markup language module 535-*b* in FIG. 5, in accordance with one or more implementations.

Ninth operation 1118 may include rendering and displaying the fourth file in one or more email clients. Ninth operation may be performed by one or more hardware processors configured by machine-readable instructions including a module that is the same as or similar to rendering module 540 in FIG. 5, in accordance with one or more implementations.

Figure 3:
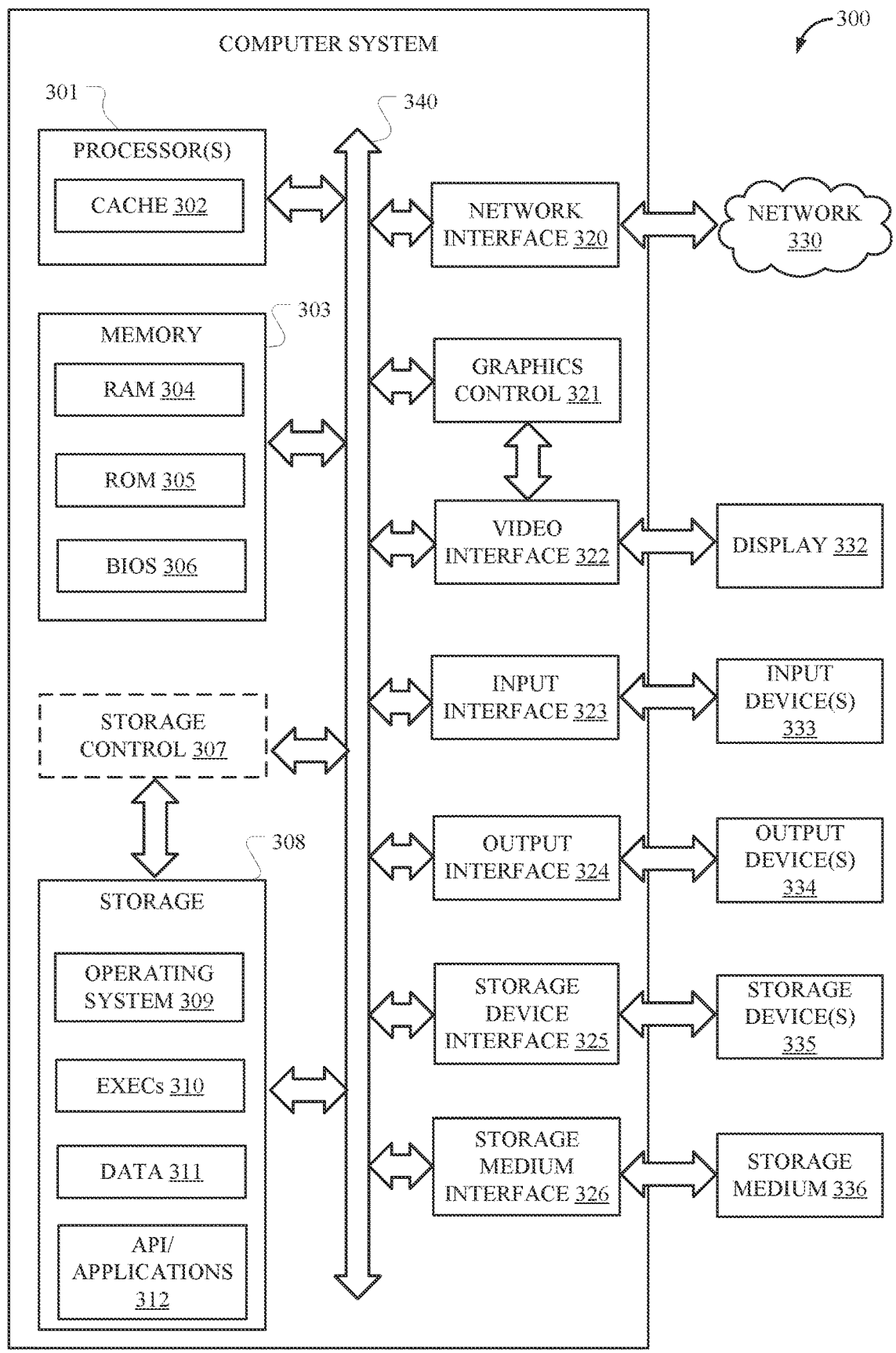
FIG. 3 illustrates a block diagram of a computing system, according to various aspects of the disclosure.

The systems and methods described herein include various computing devices such as, but not limited to, the computing system 405, computing system 505, computing system 805, and user device 810. The computing devices described herein may also be referred to as a computing system or a computer system. Referring next to FIG. 3, it is a block diagram depicting an exemplary machine that includes a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Computer system 300 may include a processor 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer readable instructions. Computer system 300 may provide functionality for the components depicted in FIG. 1 as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random-access memory component (e.g., RAM 304) (e.g., a static RAM "SRAM", a dynamic RAM "DRAM", etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECs 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 33, computer system 300 may communicate with other devices, specifically mobile devices and enterprise systems, connected to network 33. Communications to and from computer system 300 may be sent through network interface 320. For example, network interface 320 may receive incoming communications (such as requests or responses from other devices) in the form of one or more packets (such as Internet Protocol (IP) packets) from network 33, and computer system 300 may store the incoming communications in memory 303 for processing. Computer system 300 may similarly store outgoing communications (such as requests or responses to other devices) in the form of one or more packets in memory 303 and communicated to network 33 from network interface 320. Processor(s) 301 may access these communication packets stored in memory 303 for processing.

Examples of the network interface 320 include, but are not limited to, a network interface card, a modem, and any combination thereof. Examples of a network 33 or network segment 33 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 33, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 33.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for rendering e-mails, the method comprising:
    receiving a first file, wherein the first file comprises an e-mail written in Hypertext Markup Language (HTML), the email comprising styling information, non-styling information, one or more contents, and one or more tags;
    determining a display structure of the e-mail in the first file, wherein determining the display structure is based at least in part on identifying the styling information in the email;
    accessing a Document Object Model (DOM) structure of the first file, wherein the DOM structure comprises a plurality of nodes;
    creating a second file, wherein the second file comprises a first object, and wherein the second file is created by:
        parsing the DOM structure into the first object; and
        wherein identifying the styling information is further based on parsing the DOM structure into the first object;
    converting the first object into a first markup language (ML) format, wherein the converting comprises:
        creating a third file in the first ML format, the third file comprising one or more first ML blocks; and
        storing the styling information into the one or more first ML blocks;
    processing the one or more first ML blocks to create a plurality of second ML components in a second ML format;
    identifying a mapping between the first file and the plurality of second ML components;
    creating a fourth file, the fourth file comprising an HTML format, wherein the fourth file is created based on the mapping; and
    rendering and displaying the fourth file in one or more email clients.

2. The method of claim 1, wherein determining the display structure comprises inspecting one or more of:
    rows;
    columns;
    HTML Elements;
    Cascading Style Sheet (CSS) styles;
    image nodes;
    text nodes; and
    one or more media queries, where each of the one or more media queries is associated with one or more of a display resolution, an email client, a maximum screen width, a pixel density, and an orientation.

3. The method of claim 1,
wherein creating the third file in the first ML format comprises:
walking the DOM structure to determine the styling information, wherein the styling information comprises at least Cascading Style Sheet (CSS) inheritance and CSS styles directly defined within one or more of the plurality of nodes; and
wherein storing the styling information further comprises separating the styling information from the one or more contents and the non-styling information to isolate the one or more first ML blocks.

4. The method of claim 1, wherein:
the first object comprises a JavaScript Object Notation (JSON) object,
the DOM structure further comprises a root node,
each of the plurality of nodes is associated with at least one of the one or more contents and the one or more tags; and
wherein the first ML format, the second ML format, and HTML comprise different ML formats.

5. The method of claim 1, wherein the one or more first ML blocks in the third file comprise one or more of HTML ID attributes, div tags, Cascading Style Sheet (CSS) styles, and CSS elements.

6. The method of claim 5, wherein identifying the mapping between the first file and the plurality of second ML components in the second ML format comprises:
using an artificial intelligence or machine learning algorithm to map the HTML in the first file to the second ML.

7. The method of claim 6, further comprising:
rendering each of the first file and the fourth file, wherein the first file and the fourth file are rendered in at least one of different email clients and different types of user devices;
comparing the rendering of the first file and the fourth file for the at least one of the different email clients and the different types of user devices;
identifying one or more changes to the mapping between the first file and the plurality of second ML components, based at least in part on comparing the rendering; and
updating the fourth file based on identifying the one or more changes.

8. The method of claim 1, wherein, when rendered, the first file and the fourth file comprise similar or substantially similar display characteristics.

9. The method of claim 1, wherein the third file comprising the one or more first ML blocks comprises one or more of HTML ID attributes, div tags, Cascading Style Sheet (CSS) styles, and CSS elements.

10. The method of claim 1, wherein the fourth file comprise data stored in HTML syntax.

11. An email rendering and display system, comprising:
one or more hardware processors configured by machine-readable instructions to:
receive a first file, wherein the first file comprises an e-mail written in Hypertext Markup Language (HTML), the email comprising styling information, non-styling information, one or more contents, and one or more tags;
determine a display structure of the e-mail in the first file, wherein determining the display structure is based at least in part on identifying the styling information in the email;
access a Document Object Model (DOM) structure of the first file, wherein the DOM structure comprises a plurality of nodes;
create a second file, wherein the second file comprises a first object, and wherein the second file is created by:
parsing the DOM structure into the first object; and
wherein identifying the styling information is further based on parsing the DOM structure into the first object;
convert the first object into a first markup language (ML) format, wherein the converting comprises:
creating a third file in the first ML format, the third file comprising one or more first ML blocks; and
storing the styling information into the one or more first ML blocks;
process the one or more first ML blocks in the third file to create a plurality of second ML components in a second ML format;
identify a mapping between the first file and the plurality of second ML components;
create a fourth file, the fourth file comprising an HTML format, wherein the fourth file is created based on the mapping; and
render and display the fourth file in one or more email clients.

12. The email rendering and display system of claim 11, wherein determining the display structure comprises inspecting one or more of:
rows;
columns;
HTML Elements;
Cascading Style Sheet (CSS) styles;
image nodes;
text nodes; and
one or more media queries, where each of the one or more media queries is associated with one or more of a display resolution, an email client, a maximum screen width, a pixel density, and an orientation.

13. The email rendering and display system of claim 11, wherein creating the third file in the first ML format comprises:
the styling information, wherein the styling information comprises at least Cascading Style Sheet (CSS) inheritance and CSS styles directly defined within one or more of the plurality of nodes; and
wherein storing the styling information further comprises separating the styling information from the one or more contents and the non-styling information to isolate the one or more first ML blocks.

14. The email rendering and display system of claim 11, wherein:
the first object comprises a JavaScript Object Notation (JSON) object,
the DOM structure further comprises a root node,
each of the plurality of nodes is associated with at least one of the one or more contents and the one or more tags; and
wherein the first ML format, the second ML format, and HTML comprise different ML formats.

15. The email rendering and display system of claim 11, wherein the one or more first ML blocks in the third file comprise one or more of HTML ID attributes, div tags, Cascading Style Sheet (CSS) styles, and CSS elements.

16. The email rendering and display system of claim 15, wherein identifying the mapping between the first file and the plurality of second ML components in the second ML format comprises:
   using an artificial intelligence or machine learning algorithm to map the HTML in the first file to the second ML.

17. The email rendering and display system of claim 16, wherein the one or more hardware processors are further configured by machine-readable instructions to:
   render each of the first file and the fourth file, wherein the first file and the fourth file are rendered in at least one of different email clients and different types of user devices;
   compare the rendering of the first file and the fourth file for the at least one of the different email clients and the different types of user devices;
   identifying one or more changes to the mapping between the first file and the plurality of second ML components, based at least in part on comparing the rendering; and
   updating the fourth file based on identifying the one or more changes.

18. A non-transitory, tangible computer readable storage medium, encoded with processor readable instructions to perform a method for rendering e-mails, the method comprising:
   receiving a first file, wherein the first file comprises an e-mail written in Hypertext Markup Language (HTML), the email comprising styling information, non-styling information, one or more contents, and one or more tags;
   determining a display structure of the first file, wherein determining the display structure is based at least in part on identifying the styling information in the email;
   accessing a Document Object Model (DOM) structure of the first file, wherein the DOM structure comprises a plurality of nodes;
   creating a second file, wherein the second file comprises a first object, and wherein the second file is created by:
      parsing the DOM structure into the first object; and
      wherein identifying the styling information is further based on parsing the DOM structure into the first object;
   converting the first object into a first markup language (ML) format, wherein the converting comprises:
      creating a third file in the first ML format, the third file comprising one or more first ML blocks; and
      storing the styling information into the one or more first ML blocks;
   processing the one or more first ML blocks in the third file to create a plurality of second ML components in a second ML format;
   identifying a mapping between the first file and the plurality of second ML components;
   creating a fourth file, the fourth file comprising an HTML format, wherein the fourth file is created based on the mapping; and
   rendering and displaying the fourth file in one or more email clients.

19. The non-transitory computer readable storage medium of claim 18, wherein creating the third file in the first ML format comprises:
   walking the DOM structure to determine the styling information, wherein the styling information comprises at least Cascading Style Sheet (CSS) inheritance and CSS styles directly defined within one or more of the plurality of nodes;
   wherein storing the styling information further comprises separating the styling information from the one or more contents and the non-styling information to isolate the one or more first ML blocks; and
   wherein the one or more first ML blocks comprise one or more of HTML ID attributes, div tags, CSS styles, and CSS elements.

20. The non-transitory computer readable storage medium of claim 18, wherein:
   the first object comprises a JavaScript Object Notation (JSON) object,
   the DOM structure further comprises a root node,
   each of the plurality of nodes is associated with at least one of the one or more contents and the one or more tags; and
   wherein the first ML format, the second ML format, and HTML comprise different ML formats.

* * * * *